(12) United States Patent
Underwood et al.

(10) Patent No.: US 11,943,559 B2
(45) Date of Patent: *Mar. 26, 2024

(54) USER INTERFACES FOR PROVIDING LIVE VIDEO

(71) Applicant: Apple Inc., Cupertino, CA (US)

(72) Inventors: David A. Underwood, Vancouver (CA); Gary W. Gehiere, Scotts Valley, CA (US); Michael W. Greiner, Wexford, PA (US); Amy W. Hung, San Francisco, CA (US); Scott G. Marnik, Pittsburgh, PA (US); David A. Turner, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,266

(22) Filed: Apr. 18, 2023

(65) Prior Publication Data

US 2023/0254440 A1  Aug. 10, 2023

Related U.S. Application Data

(63) Continuation of application No. 17/564,967, filed on Dec. 29, 2021, now Pat. No. 11,671,554.

(Continued)

(51) Int. Cl.
*H04N 5/272* (2006.01)
*G06F 3/0482* (2013.01)
(Continued)

(52) U.S. Cl.
CPC ........... *H04N 5/272* (2013.01); *G06F 3/0482* (2013.01); *G06F 40/166* (2020.01); *H04N 5/268* (2013.01); *H04N 5/76* (2013.01); *H04N 23/90* (2023.01)

(58) Field of Classification Search
CPC ...................................................... H04N 5/272
See application file for complete search history.

(56) References Cited

U.S. PATENT DOCUMENTS

| 11,263,397 B1* | 3/2022 | Yu ........................... H04N 7/147 |
| 2015/0121232 A1* | 4/2015 | Edwardson ........... G06F 40/106 |
| | | 715/732 |

(Continued)

OTHER PUBLICATIONS

Non-Final Office Action received for U.S. Appl. No. 17/564,967, dated Nov. 18, 2022, 7 pages.

(Continued)

*Primary Examiner* — Roland J Casillas
(74) *Attorney, Agent, or Firm* — DLA Piper LLP (US)

(57) ABSTRACT

The present disclosure generally relates to providing live video. An example method includes, at a computer system, while in an editing mode for a presentation, receiving, via one or more input devices, a request to insert an object onto a first slide of the presentation, wherein the request includes associating the object with a source for live video; and while in a presentation mode for the presentation, displaying, via a display generation component, the first slide including concurrent display of the object and one or more visual elements, wherein: in accordance with a determination that the object is associated with a camera, the object includes a live video stream from the camera; and in accordance with a determination that the object is associated with a non-camera external device, the object includes a live video stream that mirrors a portion of a display of the non-camera external device.

33 Claims, 20 Drawing Sheets

Related U.S. Application Data

(60) Provisional application No. 63/249,005, filed on Sep. 27, 2021.

(51) Int. Cl.
*G06F 40/166* (2020.01)
*H04N 5/268* (2006.01)
*H04N 5/76* (2006.01)
*H04N 23/90* (2023.01)

(56) References Cited

U.S. PATENT DOCUMENTS

2022/0210342 A1\* 6/2022 Stickane ............... H04L 65/765
2023/0115250 A1 4/2023 Scallon

OTHER PUBLICATIONS

Notice of Allowance received for U.S. Appl. No. 17/564,967, dated Jan. 19, 2023, 10 pages.

\* cited by examiner

700 

705
while in an editing mode for a presentation, receiving, via one or more input devices, a request to insert a live object onto a first slide of the presentation, wherein the request includes associating the live object with a source for live video

710
while in a presentation mode for the presentation, displaying, via a display generation component, the first slide including concurrent display of the live object and one or more visual elements

715
in accordance with a determination that the live object is associated with a first camera, the live object includes a live video stream from the first camera

720
in accordance with a determination that the live object is associated with a non-camera external device, the live object includes a live video stream that mirrors at least a portion of a display of the non-camera external device

*FIG. 7*

USER INTERFACES FOR PROVIDING LIVE VIDEO

CROSS-REFERENCE TO RELATED APPLICATIONS

This application is a continuation of U.S. patent application Ser. No. 17/564,967, entitled "USER INTERFACES FOR PROVIDING LIVE VIDEO," filed on Dec. 29, 2021, which claims priority to U.S. Provisional Patent Application Ser. No. 63/249,005, entitled "USER INTERFACES FOR PROVIDING LIVE VIDEO," filed on Sep. 27, 2021. The contents of these applications are hereby incorporated by reference in their entireties.

FIELD

The present disclosure relates generally to computer user interfaces, and more specifically to techniques for providing live video.

BACKGROUND

Presentations are commonly used demonstrations used to convey information about a topic or subject of interest. A presentation may have numerous slides, among which a presenter can switch while presenting.

BRIEF SUMMARY

Some techniques for playback of video in presentations are limited in the manner in which video can be provided. For example, some existing techniques require that video be composited into slides of a presentation, which may require relatively high amounts of computational resources as well as preclude the use of live video in such presentations.

Accordingly, the present technique provides electronic devices with faster, more efficient methods and interfaces for providing live video. Such methods and interfaces optionally complement or replace other methods for providing live video. Such methods reduce the cognitive burden on a user and produce a more efficient human-machine interface, for instance, by reducing the number of inputs required by provide live video. For battery-operated computing devices, such methods and interfaces conserve power and increase the time between battery charges.

Example methods are described herein. An example method incudes, while in an editing mode for a presentation, receiving, via one or more input devices, a request to insert a live object onto a first slide of the presentation, wherein the request includes associating the live object with a source for live video; and while in a presentation mode for the presentation, displaying, via a display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: while in an editing mode for a presentation, receiving, via the one or more input devices, a request to insert a live object onto a first slide of the presentation, wherein the request includes associating the live object with a source for live video; and while in a presentation mode for the presentation, displaying, via the display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

Example transitory computer-readable storage media are described herein. An example non-transitory computer-readable storage medium stores one or more programs configured to be executed by one or more processors of a computer system that is in communication with a display generation component and one or more input devices, the one or more programs including instructions for: while in an editing mode for a presentation, receiving, via the one or more input devices, a request to insert a live object onto a first slide of the presentation, wherein the request includes associating the live object with a source for live video; and while in a presentation mode for the presentation, displaying, via the display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

Example systems are described herein. An example computer system is configured to communicate with a display generation component and one or more input devices and comprises: one or more processors; and memory storing one or more programs configured to be executed by the one or more processors, the one or more programs including instructions for: while in an editing mode for a presentation, receiving, via the one or more input devices, a request to insert a live object onto a first slide of the presentation, wherein the request includes associating the live object with a source for live video; and while in a presentation mode for the presentation, displaying, via the display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

An example system is configured to communicate with a display generation component and one or more input devices and comprises: means for, while in an editing mode for a presentation, receiving, via the one or more input devices, a request to insert a live object onto a first slide of the presentation, wherein the request includes associating the live object with a source for live video; and means for, while in a presentation mode for the presentation, displaying, via the display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

Example computer program products are described herein. An example computer program product comprises one or more programs configured to be executed by one or more processors of a computer system that is in communication with a display generation component and one or more input devices, the one or more programs including instructions for: while in an editing mode for a presentation, receiving, via the one or more input devices, a request to insert a live object onto a first slide of the presentation, wherein the request includes associating the live object with a source for live video; and while in a presentation mode for the presentation, displaying, via the display generation component, the first slide including concurrent display of the live object and one or more visual elements, wherein: in accordance with a determination that the live object is associated with a first camera, the live object includes a live video stream from the first camera; and in accordance with a determination that the live object is associated with a non-camera external device, the live object includes a live video stream that mirrors at least a portion of a display of the non-camera external device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing live video, thereby increasing the effectiveness, efficiency, and user satisfaction with such devices. Such methods and interfaces may complement or replace other methods for providing live video.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flowchart of a process for providing live video in accordance with some embodiments.

DESCRIPTION OF EMBODIMENTS

Figure 1A:
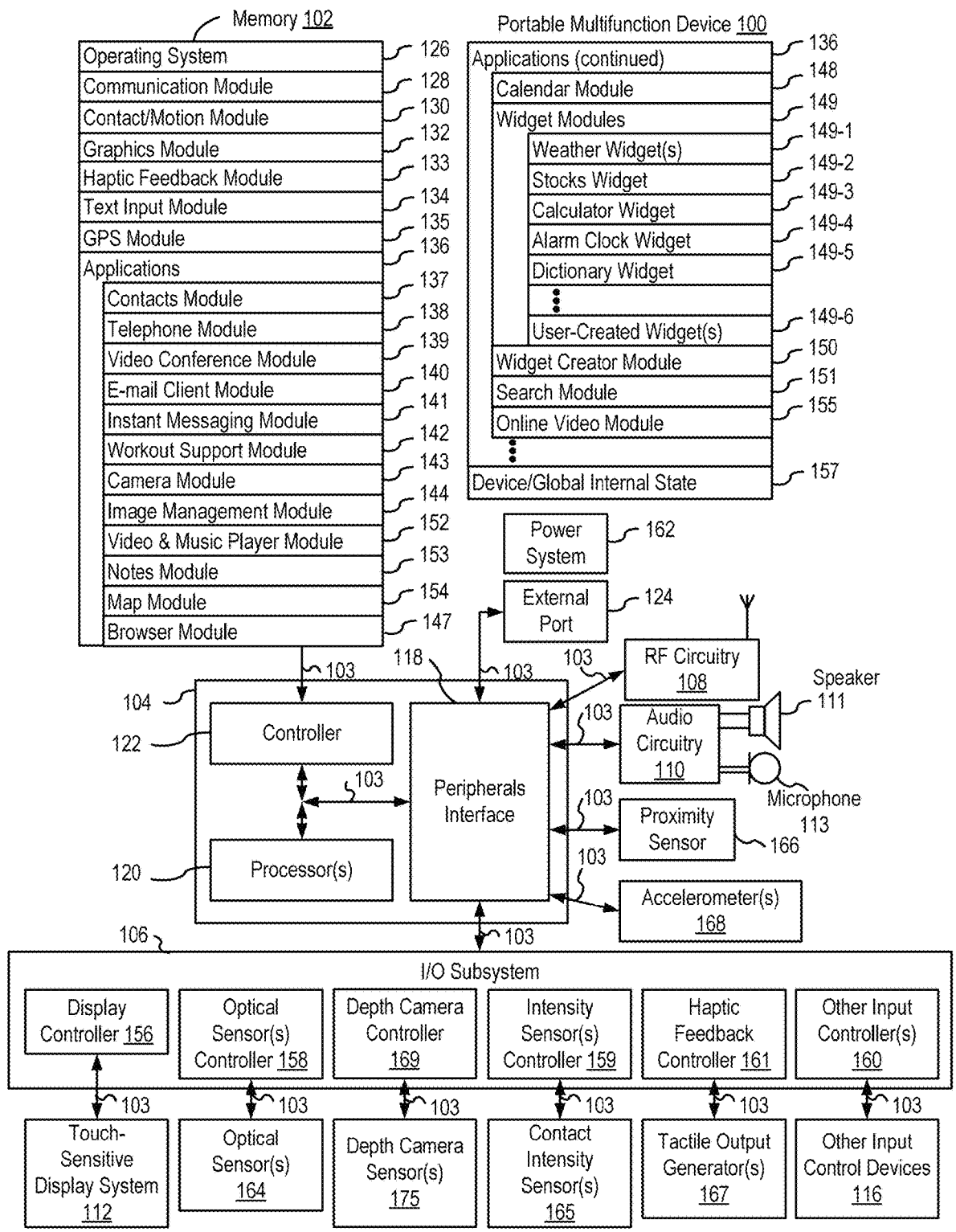
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing live video. For example, computer systems, such as those described herein provide a manner in which users can insert live objects into presentations such that live video is provided both while editing and presenting the presentation. Such techniques can reduce the cognitive burden on a user who provides live video, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for providing live video. FIGS. 6A-6K illustrate exemplary user interfaces for providing live video. FIG. 7 is a flow diagram illustrating methods of providing live video in accordance with some embodiments. The user interfaces in FIGS. 6A-6K are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
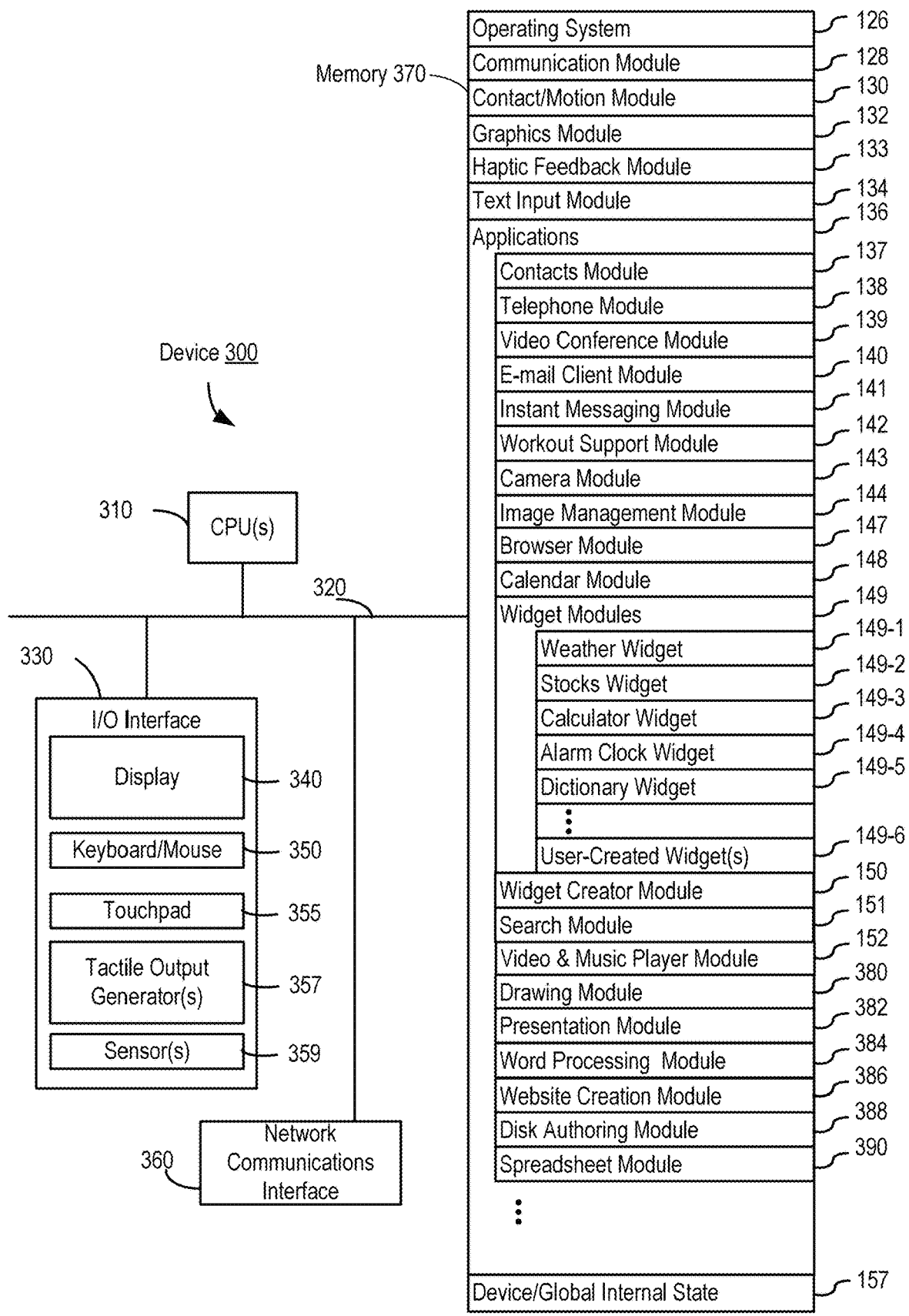
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
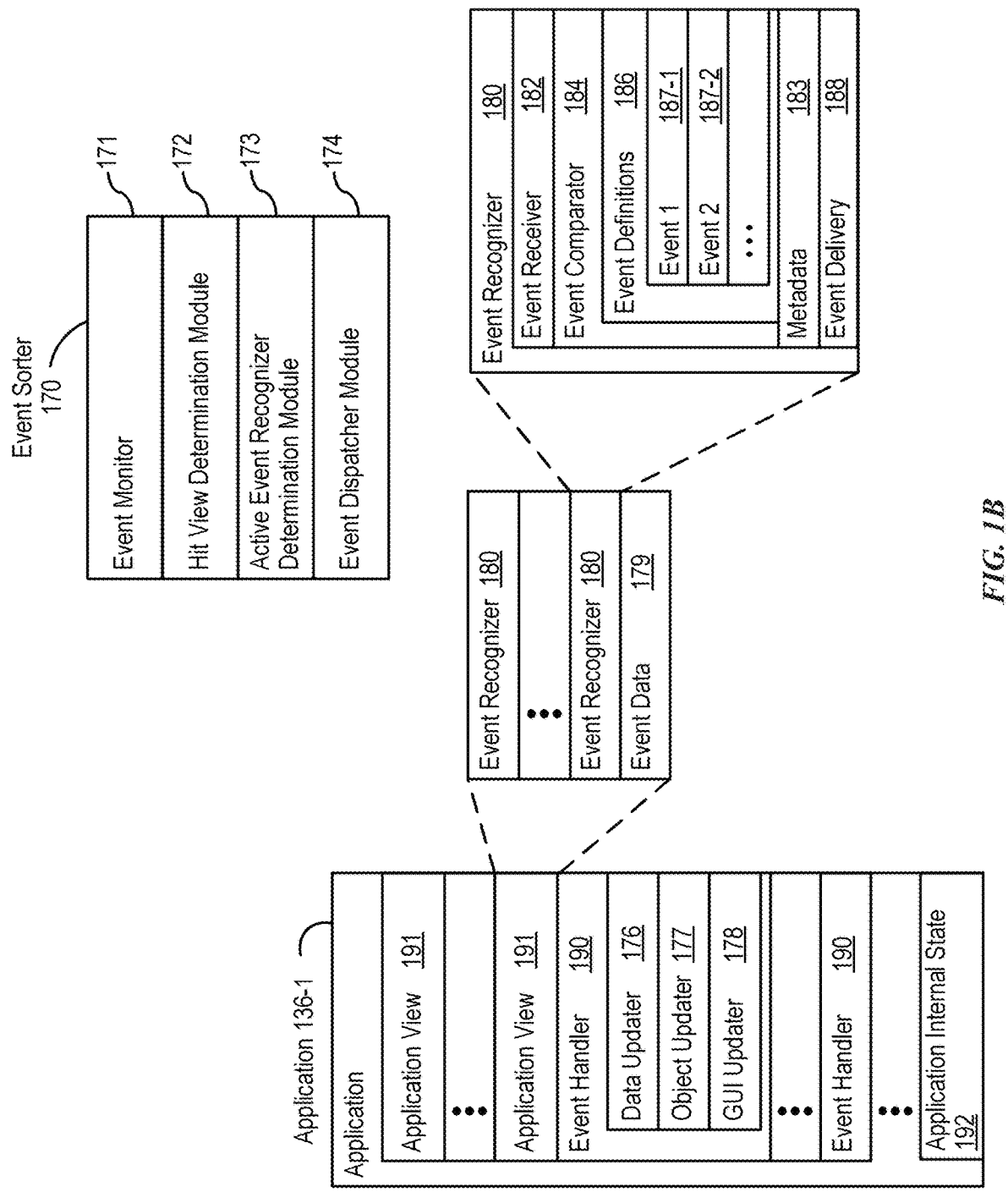
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
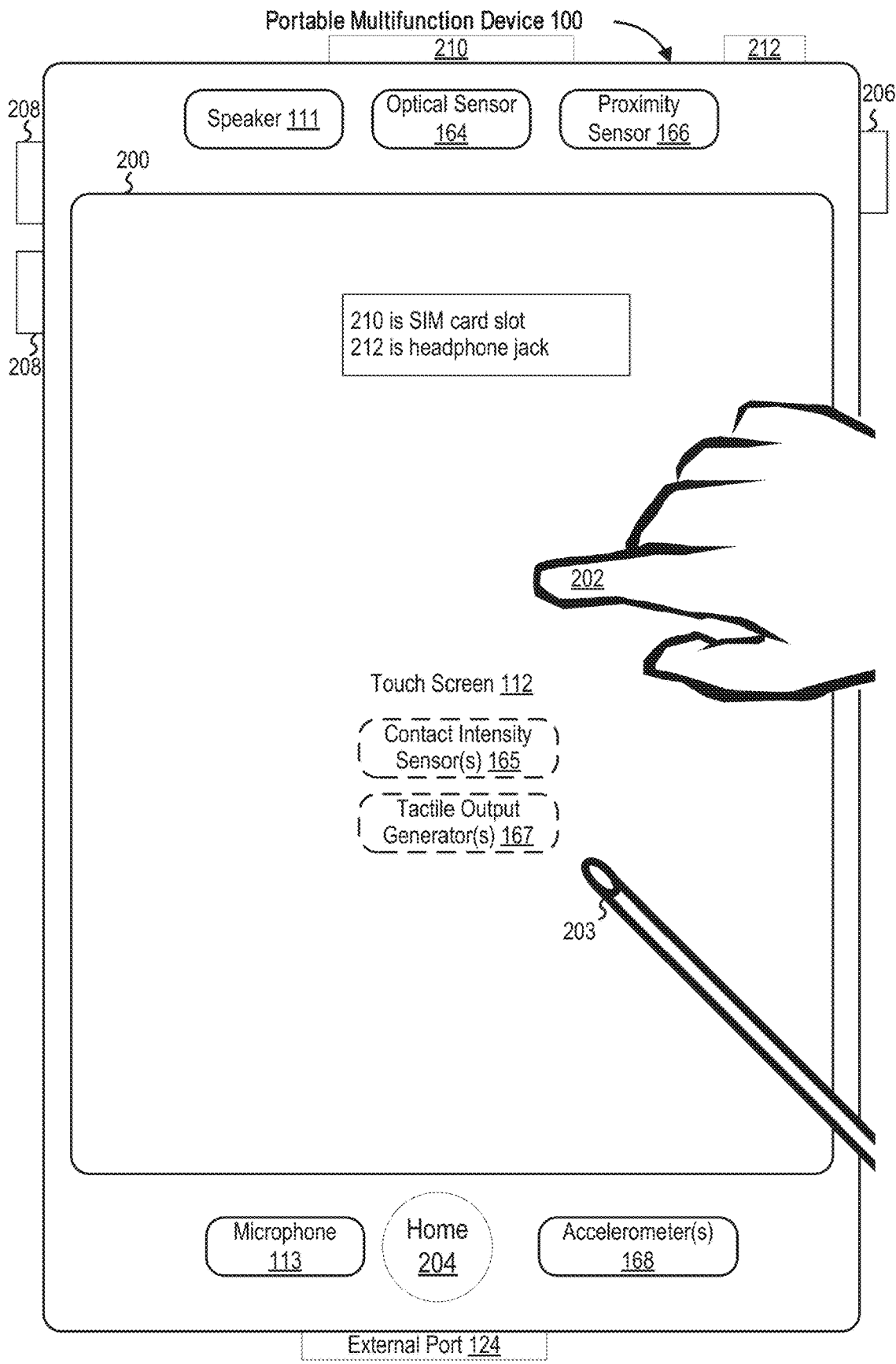
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
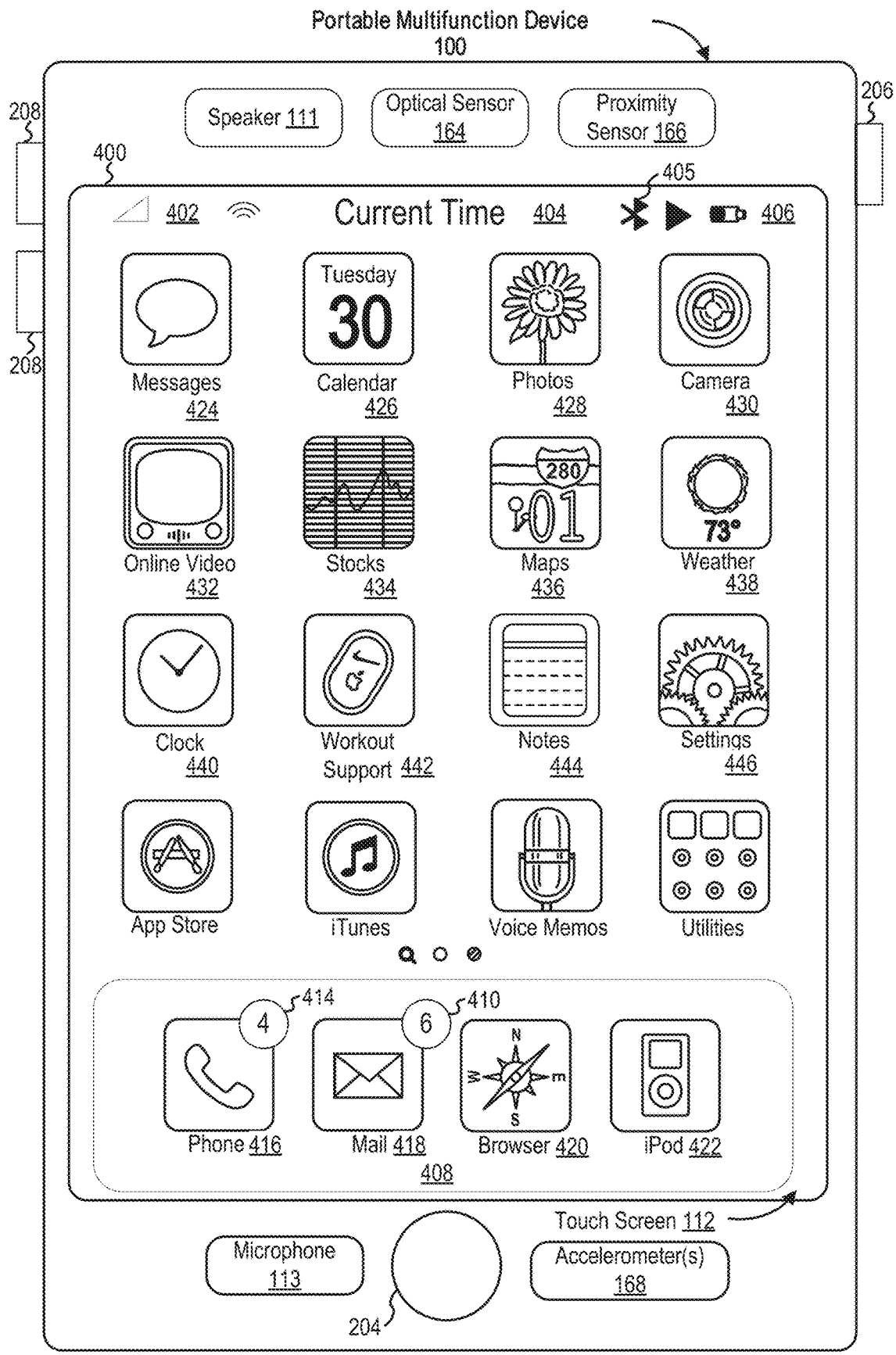
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
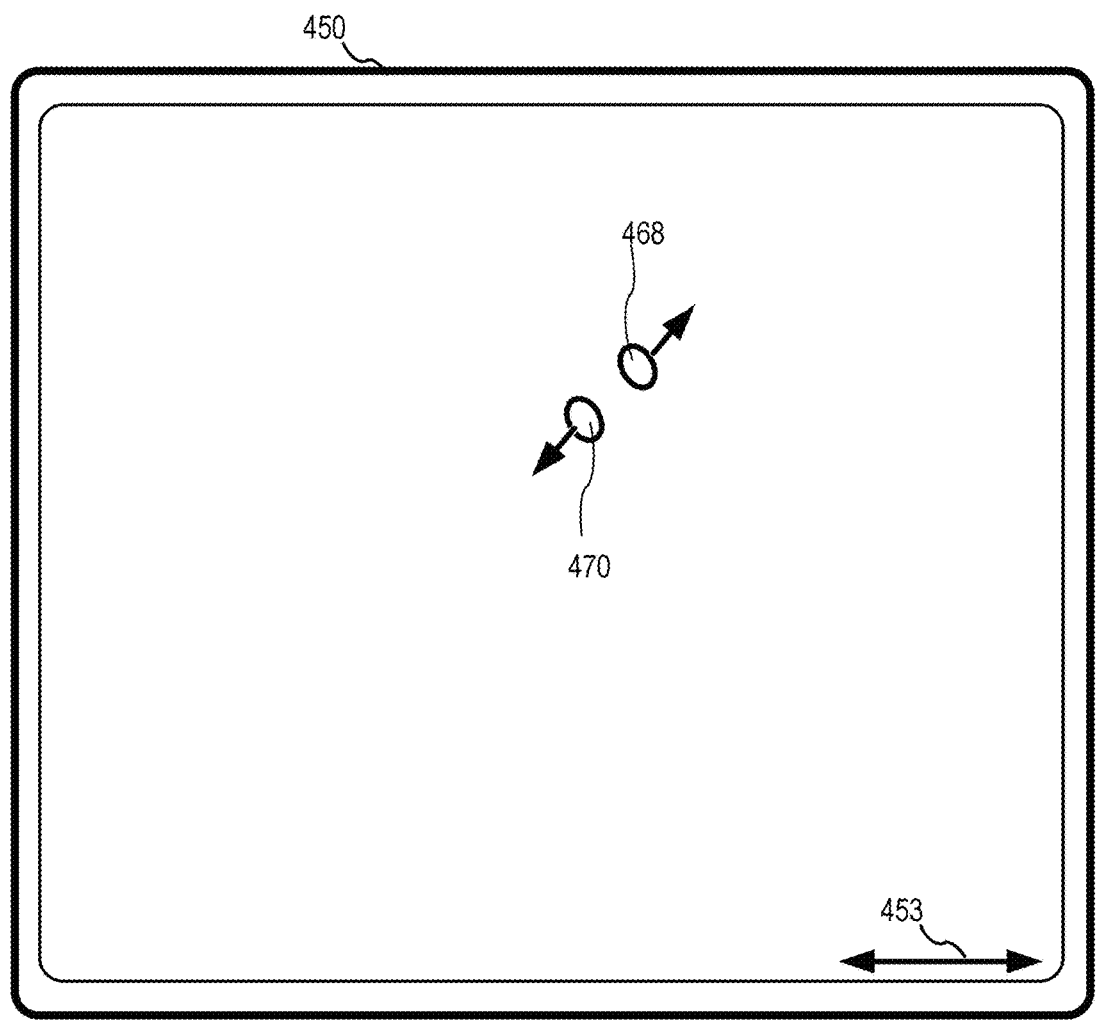
FIG. 4B illustrates an exemplary user interface for a multifunction device with a touch-sensitive surface that is separate from the display in accordance with some embodiments.
Figure 4B:
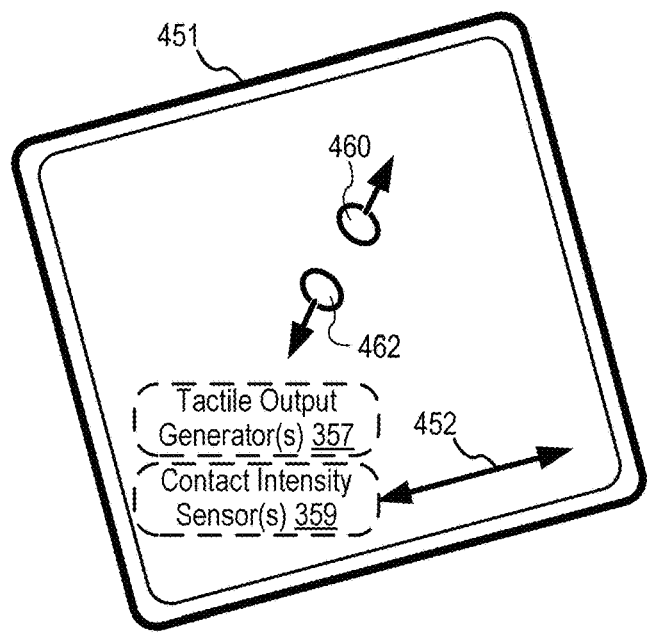

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
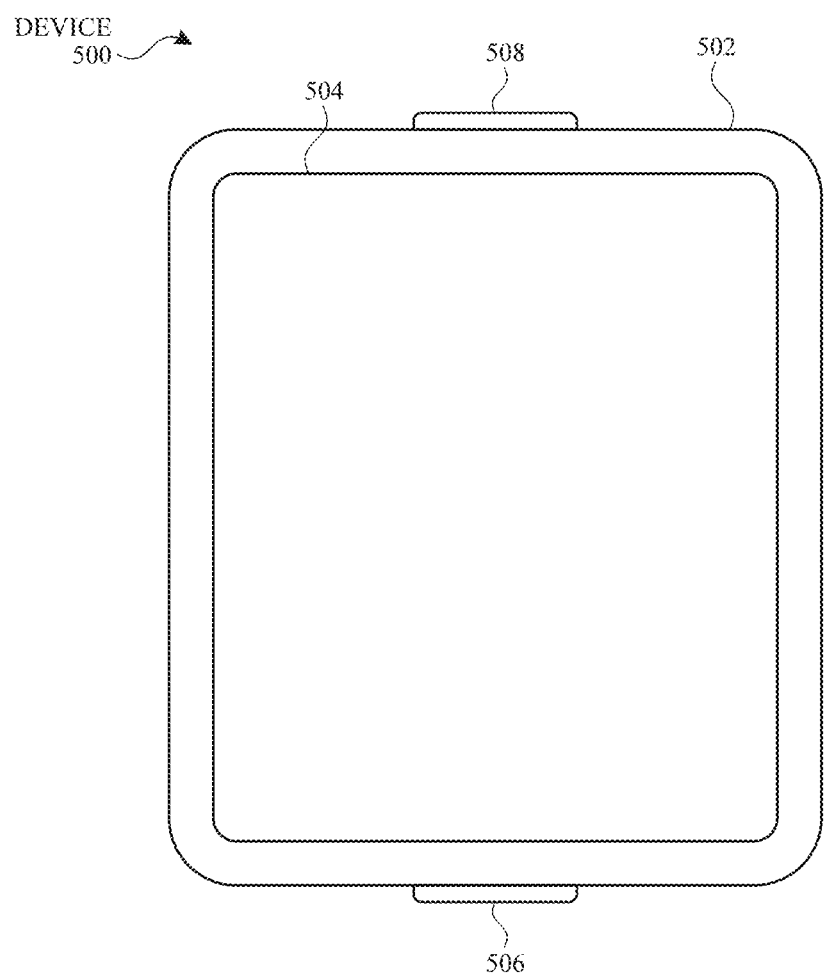
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Ser. No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Ser. No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
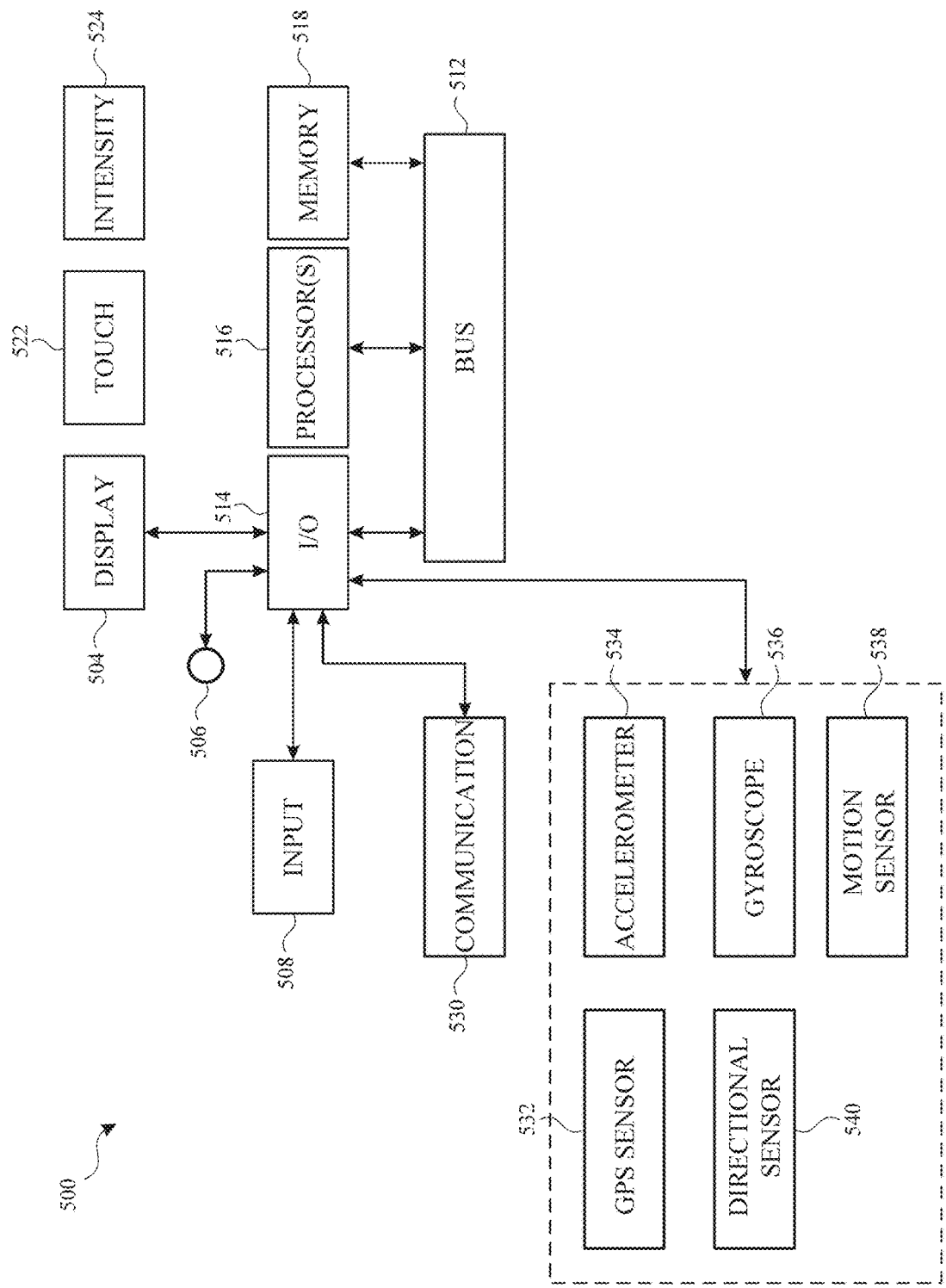
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UP") and associated processes that are implemented on an electronic device, such as portable multifunction device 100, device 300, or device 500.

FIGS. 6A-6K illustrate exemplary user interfaces for providing live video, in accordance with some embodiments. The user interfaces in these figures are used to illustrate the processes described below, including the processes in FIG. 7.

Generally, implementation of various techniques for providing live video described below allow a user to stream (e.g., display) live video when editing and/or presenting a presentation. Live video streams provided in this manner can, optionally, include a live video stream captured by a camera and/or a live video stream provided by a non-camera electronic device (e.g., mobile device, a smart phone, and/or a tablet) that mirrors at least a portion of a display of the electronic device.

FIGS. 6A-6I illustrate examples in which an electronic device (e.g., a laptop computer) operates in an editing mode for a presentation. The editing mode may be initiated, for instance, using a presentation program.

Figure 6A:
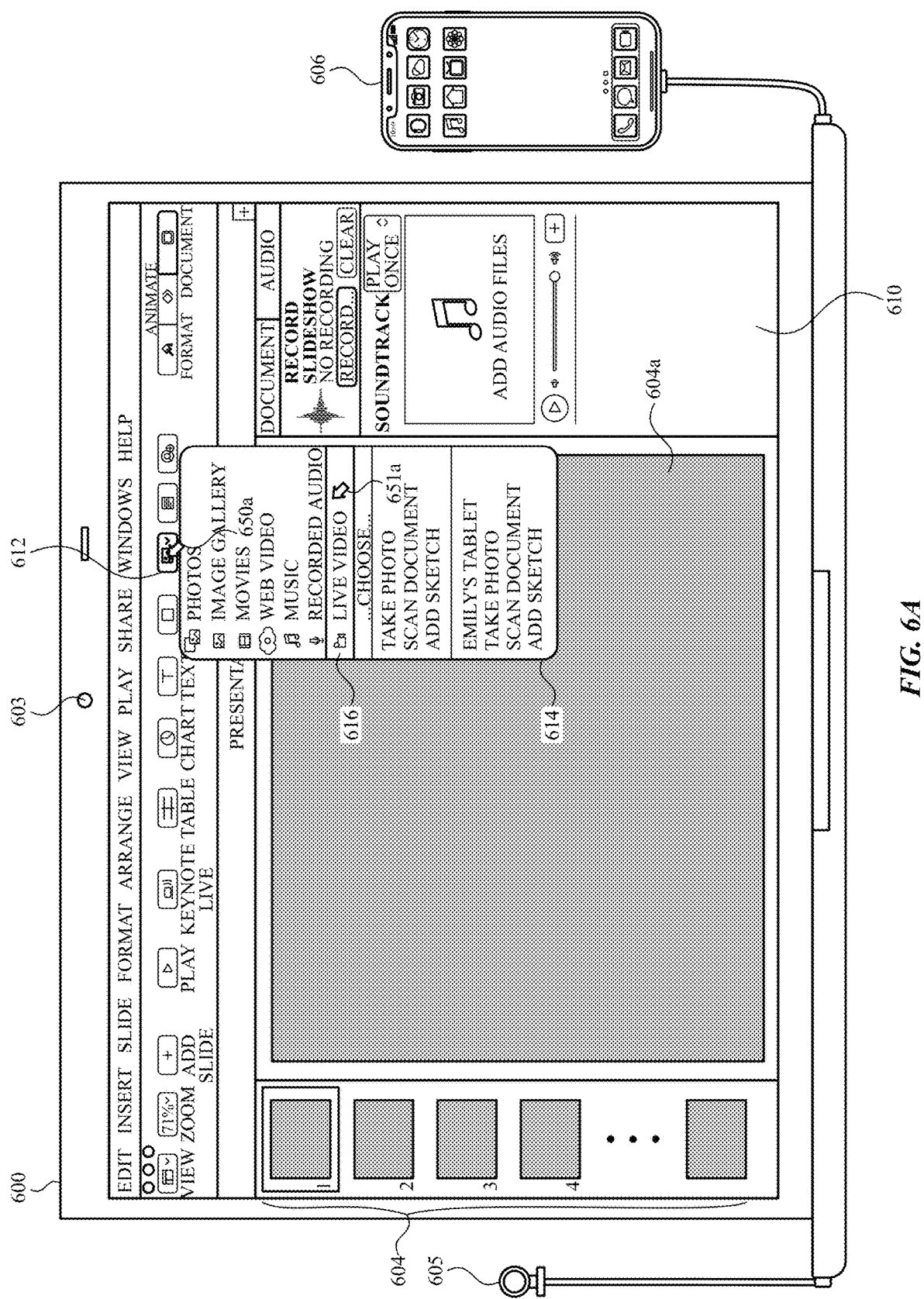
FIGS. 6A-6K illustrate exemplary user interfaces for providing live video in accordance with some embodiments.

With reference to FIG. 6A, electronic device 600 is a multifunction device and has one or more components described above in relation to one or more of devices 100, 300, and 500. In some embodiments, electronic device 600 includes a display 602 and a camera 603. Camera 603 is, optionally, a front-facing camera integrated in the housing of device 600. In some embodiments, electronic device 600 is in communication with one or more external devices (e.g., cameras, mobile devices), including but not limited to camera 605 (e.g., a camera not integrated into the housing of device 600) and electronic device 606 (e.g., a smart phone).

FIG. 6A depicts an example in which user operates device 600 in an editing mode of a presentation program to edit a first slide 604a of presentation 604. While operating in the editing mode, device 600 displays, on display 602, editing interface 610. Editing interface 610 includes menu affordances, such as menu affordance 612. The menu affordances may be used to access various menus and/or features of the presentation program.

Figure 6B:
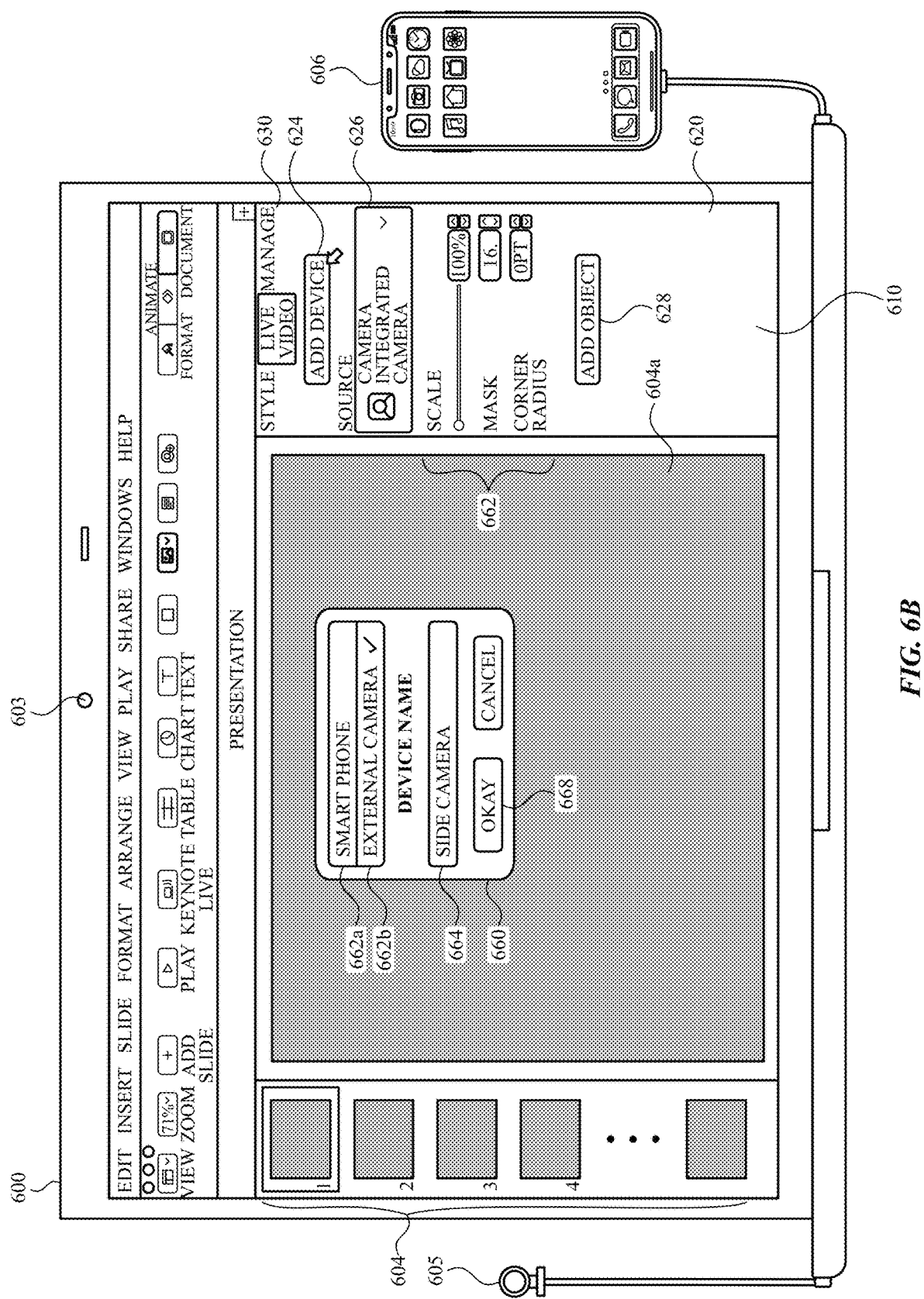

While displaying editing interface 610, device 600 detects selection of menu affordance 612. The selection is a user input 650a (e.g., mouse click) on menu affordance 612 and causes device 600 to display menu 614, as shown in FIG. 6A. While displaying menu 614, device 600 detects selection of live object affordance 616. The selection is a user input 651a (e.g., mouse click) on the live object affordance 616. As shown in FIG. 6B, in response to user input 651a, device 600 displays live object configuration interface 620, which is optionally overlaid on editing interface 610 in some embodiments.

Generally, live object configuration interface 620 is used to perform a process for editing various characteristics (e.g., properties) of a live object (e.g., live object 634 of FIG. 6F) and/or inserting the live object onto a slide (e.g., slide 604a) of a presentation. In some embodiments, the live object includes a live video stream from (e.g., provided by) a live video source, such as a camera (e.g., camera 603, camera 605) or non-camera electronic device (e.g., electronic device 606). In some embodiments, characteristics of a live object may be edited before and/or after insertion of the live object onto a slide.

For example, live object configuration interface 620 includes visual features 622, add device affordance 624, source selector 626, add object affordance 628, and manage affordance 630. Visual features 622 include various features which may be used to specify the manner in which a live object is to be displayed (e.g., once inserted onto a slide). Visual features 622 may, for instance, be used to specify a size, shape, orientation, and/or location of a live object.

In some examples, editing a live object includes selecting a live video source for the live object. In some instances, however, an accessory device may not yet be configured for use as a live video source. Accordingly, add device affordance 624 can be used to add an accessory device as a live video source. For example, with reference to FIG. 6B, while displaying live object configuration interface 620, device 600 detects selection of add device affordance 624. The selection is a user input 650b (e.g., mouse click) on the add device affordance 624. In response, device 600 displays add device menu 660 including a plurality of candidate devices 662 (e.g., candidate devices 662a and 662b) and name field 664. While device menu 660 is displayed, an accessory device to be used as a live video source is selected from candidate devices 662 and a name for the accessory device is received in name field 664. In response to selection of completion affordance 668, the selected candidate device 662 is added to a list of accessory devices for which a live video stream is available for live objects.

Figure 6C:
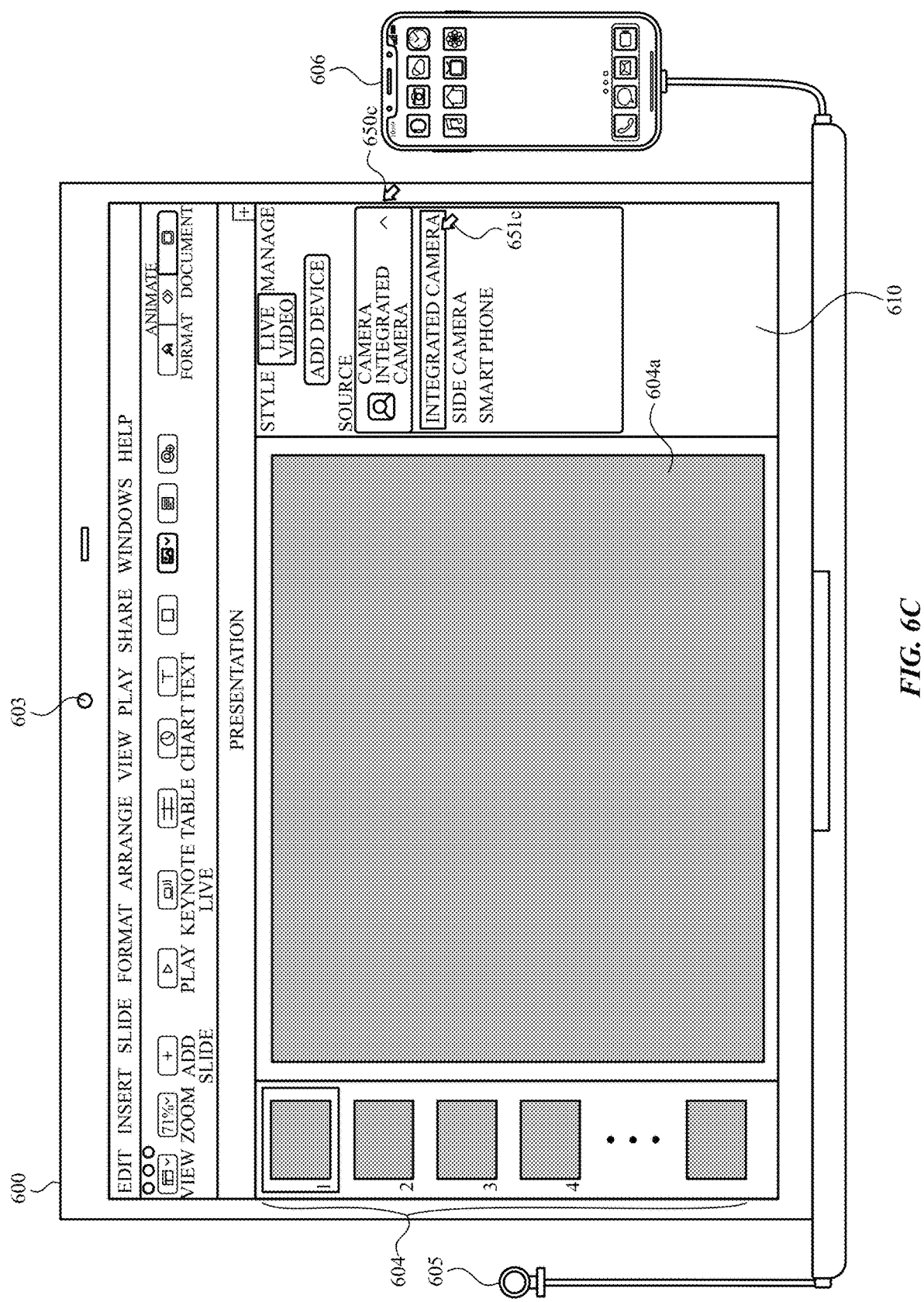

A live video source is selected for a live object using source selector 626. When selected, source selector 626 causes device 600 to display a list of one or more accessory devices from which a live video stream is available for the live object (recall that this list can include any number of devices added using add device affordance 624, as described). In some embodiments, source selector 626 is a dropdown list. Accordingly, as shown in FIG. 6C, in response to input 650c, device 600 expands source selector 626 to display accessory devices from which a live video stream is available. In the illustrated example, such accessory devices include an "Integrated Camera" (i.e., camera 602), a "Side Camera" (i.e., camera 605), and a "Smart Phone" (i.e., device 606). Once accessory devices have been displayed in this manner, an accessory device may be selected as a live video source for a live object. As shown in FIG. 6C, "Integrated Camera" (i.e., camera 602) is selected as the live video source for a live object via input 651c.

In some embodiments, source selector 626 can be used to modify a live video source for a live object. For example, an additional selection of source selector 626 may cause device 600 to display, for an additional time, the list of accessory devices from which a live video stream is available. Thereafter, selection of an accessory device of the list of accessory devices will cause the selected accessory device to be assigned as the live video source for a live object. In some embodiments, source selector 626 can be used to modify a live video source of a live object prior to inserting the live object onto a slide. In some embodiments, source selector 626 can be used to modify a live video source of a live object after inserting the live object onto a slide.

Figure 6D:
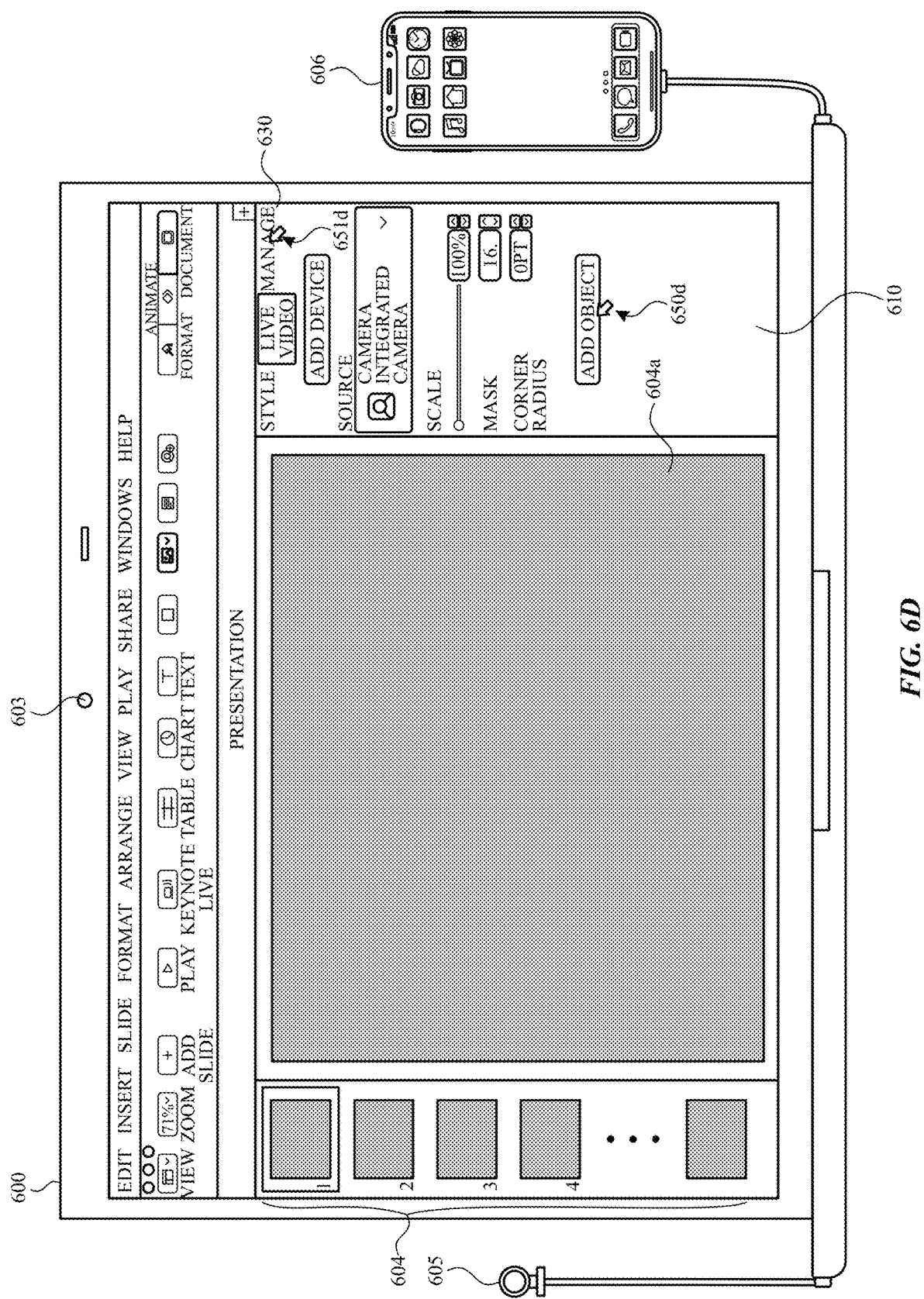
Figure 6E:
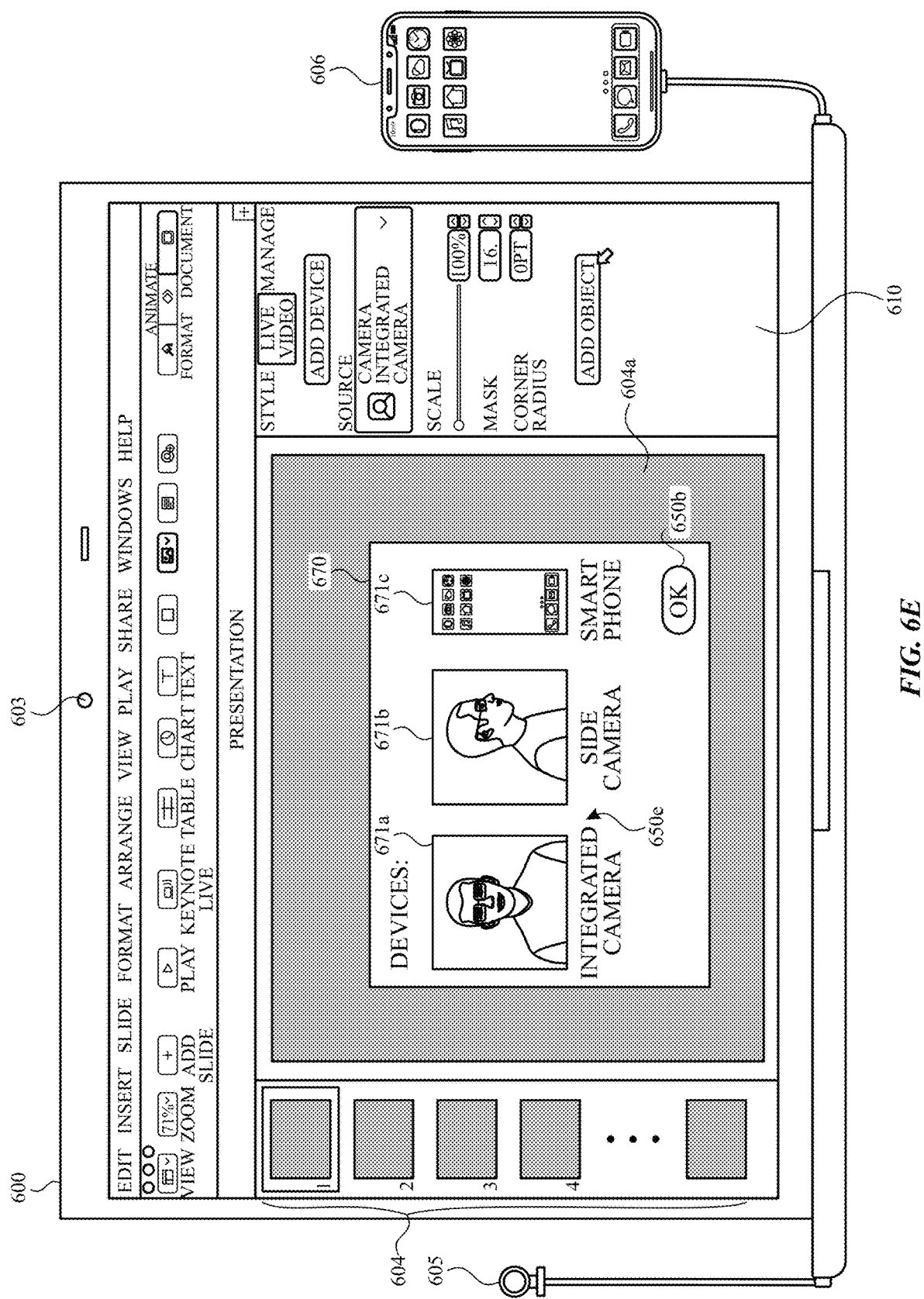
Figure 6F:
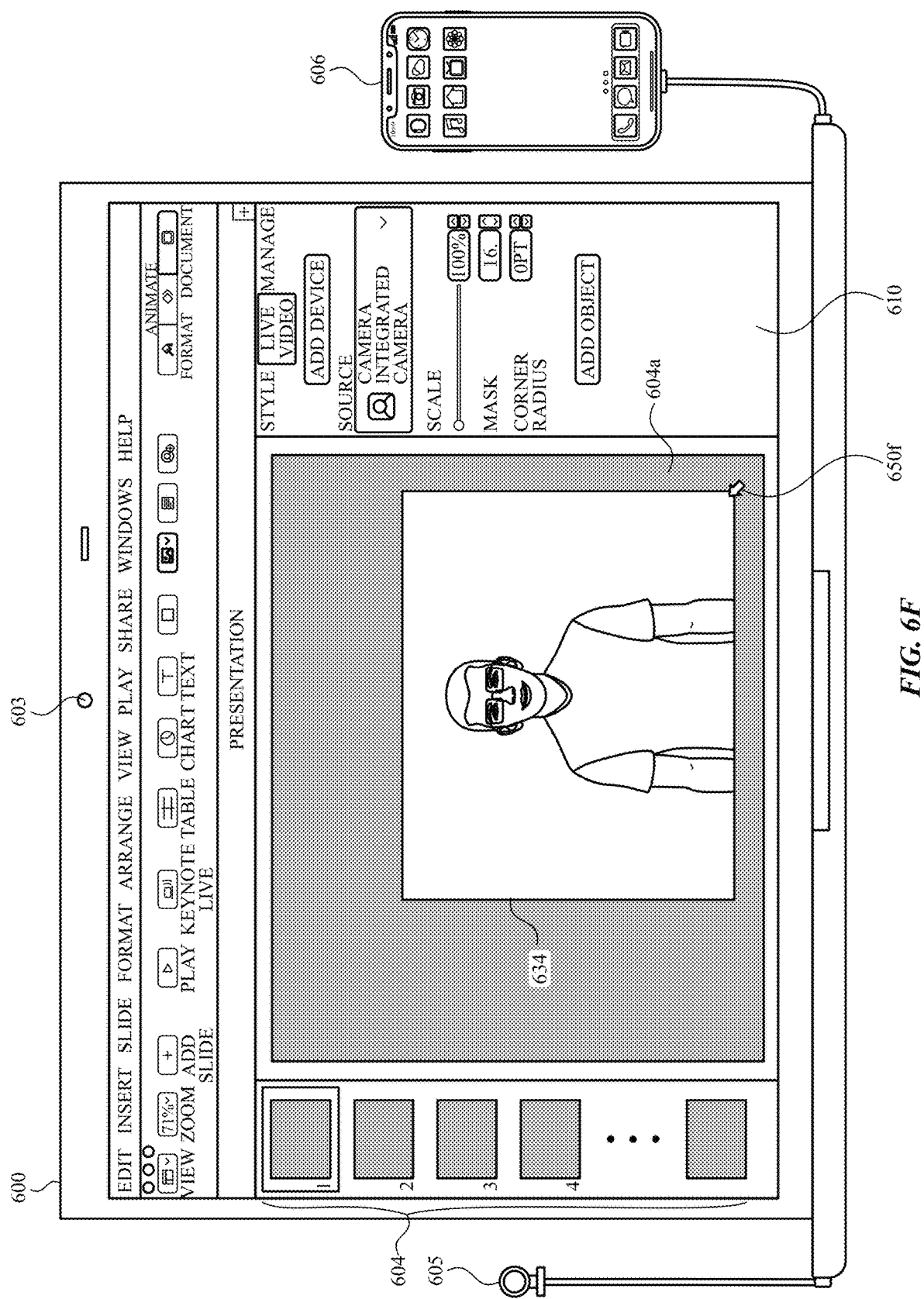

Once a source (e.g., an accessory device) for a live object has been selected, the live object can, optionally, be inserted onto slide 604a. With reference to FIG. 6D, for example, while displaying live object configuration interface 620, device 600 detects selection of add object affordance 628. The selection is a user input 650d (e.g., mouse click) on add object affordance 628 and causes device 600 to insert live object 634 onto slide 604a, as shown in FIG. 6F. Once inserted, live object 634 includes a live video stream provided by the live video source associated with live object 634, "Integrated Camera" (i.e., camera 602). In the illustrated example, "Integrated Camera" (i.e., camera 602) is the live video source selected for live object 634, and live object 634 includes a live video stream of user 636 positioned in front of camera 602 (recall that camera 602 may be a front-facing integrated camera).

In some embodiments, live video sources for a live object may be selected in other manners. Returning to FIG. 6D, for example, while displaying editing interface 610, device 600 detects selection of manage affordance 630. The selection is a user input 651d (e.g., mouse click) on manage affordance 630 and causes device 600 to display device management menu 670, as illustrated in FIG. 6E. Device management menu 670 includes live video previews 671 (e.g., live video previews 671a-671c) for each accessory device that may be selected as a live video source. In some embodiments, each live video preview 671 includes a live video stream from a corresponding accessory device. By way of example, live video preview 671a includes a live video stream from "Integrated Camera" (i.e., device 602), live video preview 671b includes a live video stream from "Side Camera" (i.e., device 605), and live video preview 671*c* includes a live video stream from "Smart Phone" (i.e., device 606). Displaying device management menu 670 in this manner allows a user (e.g., user 636) to simultaneously view live video streams for multiple devices, and optionally, select a live video source for a live object. As illustrated in FIG. 6E, user 636 is sitting in front of device 600 and live video preview 671*a* is providing a live front view of user 636, live video preview 671*b* is providing a live side view of user 636, and live video preview 671*c* is providing a live video stream that mirrors the display of device 606. In some embodiments, in response to selection of live video preview 671*a* via input 650*e*, "Integrated Camera" (i.e., camera 602) is selected as a live video source for a live object. In some embodiments, selection of a live video preview 671 additionally or alternatively causes a live video object (e.g., live video object 634) to be inserted onto slide 604*a*, as shown in FIG. 6F.

Figure 6G:
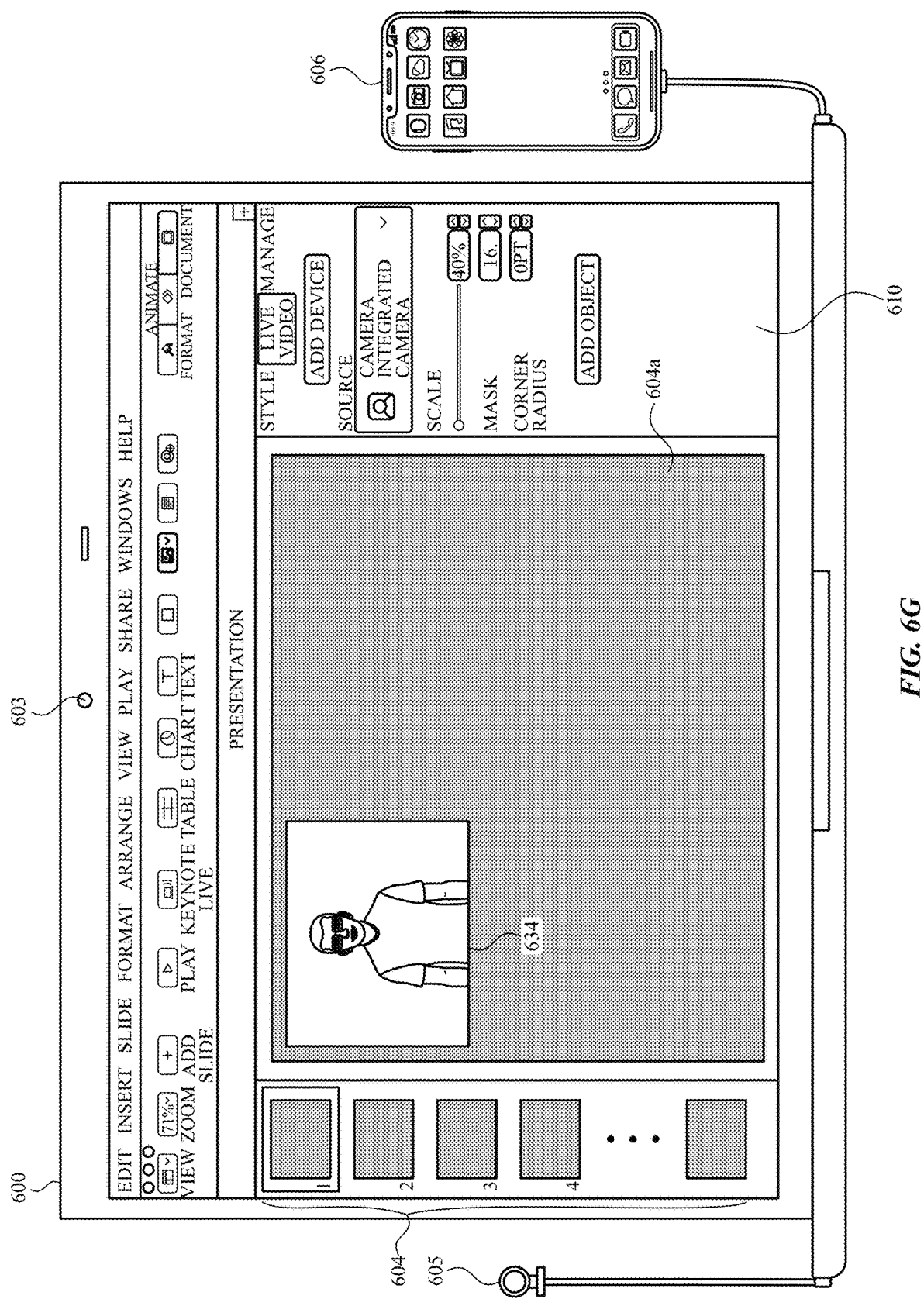

As described, characteristics (e.g., visual characteristics) of live objects may be edited (e.g., modified) in some embodiments. As an example, sizes and/or positions of live objects are visual characteristics that may be edited. As illustrated in FIGS. 6F-6G, in response to one or more inputs (e.g., a drag input, click and drag input 650*f*) a size of live object 634 has been reduced and a position of live object 634 has been adjusted such that live object 634 is positioned closer to the leftmost and uppermost edges of slide 604*a*.

Figure 6H:
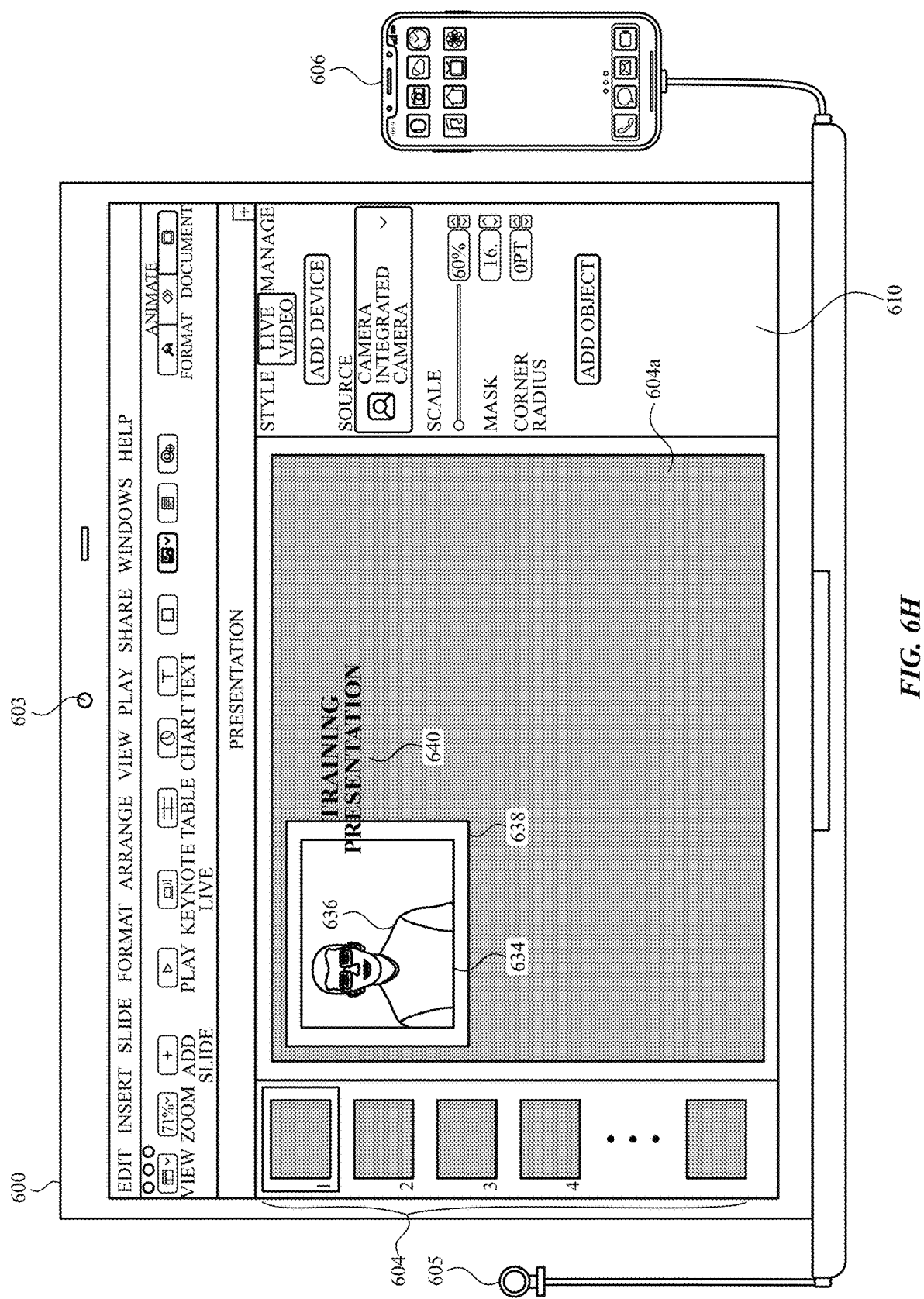

In some embodiments, a visual characteristic of a live object may be edited such that only a portion of a live video stream is displayed. For example, as shown in FIG. 6H, a portion of the live video stream included in live object 634 is not displayed. Rather, the live video stream includes only a portion (e.g., upper-right portion, non-centered portion) of the field of view of "Integrated Camera" (i.e., camera 602). In some embodiments, which portion(s) of a live video stream are included and/or not included in a live object can be selected by a user.

In some embodiments, electronic device 600 receives user input to add one or more other visual elements, such as text and/or static images onto the slide. For example, as shown in FIG. 6H, as a result of user input, live object 634 is concurrently displayed on slide 604*a* with other visual elements (e.g., static objects, live objects) in the presentation editing mode. As shown in FIG. 6H, for another example, frame 638 has been inserted onto slide 604*a* and at least partially overlaid on live object 634 (e.g., frame 638 has a shallower depth than live object 634 on slide 604*a*) such that the portion of live object 634 intersecting with frame 638 is not displayed in slide 604*a*. Additionally, text box 640 has been inserted onto slide 604*a* and at least partially overlaid on live object 634 such that the portion of live object 634 intersecting with the text of text box 640 is not displayed in slide 604*a*. The portions of live object 634 not intersecting with frame 638 and text box 640 continue to display a live video stream, as described. In the example of FIG. 6H, text 640 is in a layer above that of live object 634 and text 640 is partially overlaid on text 634.

Figure 6I:
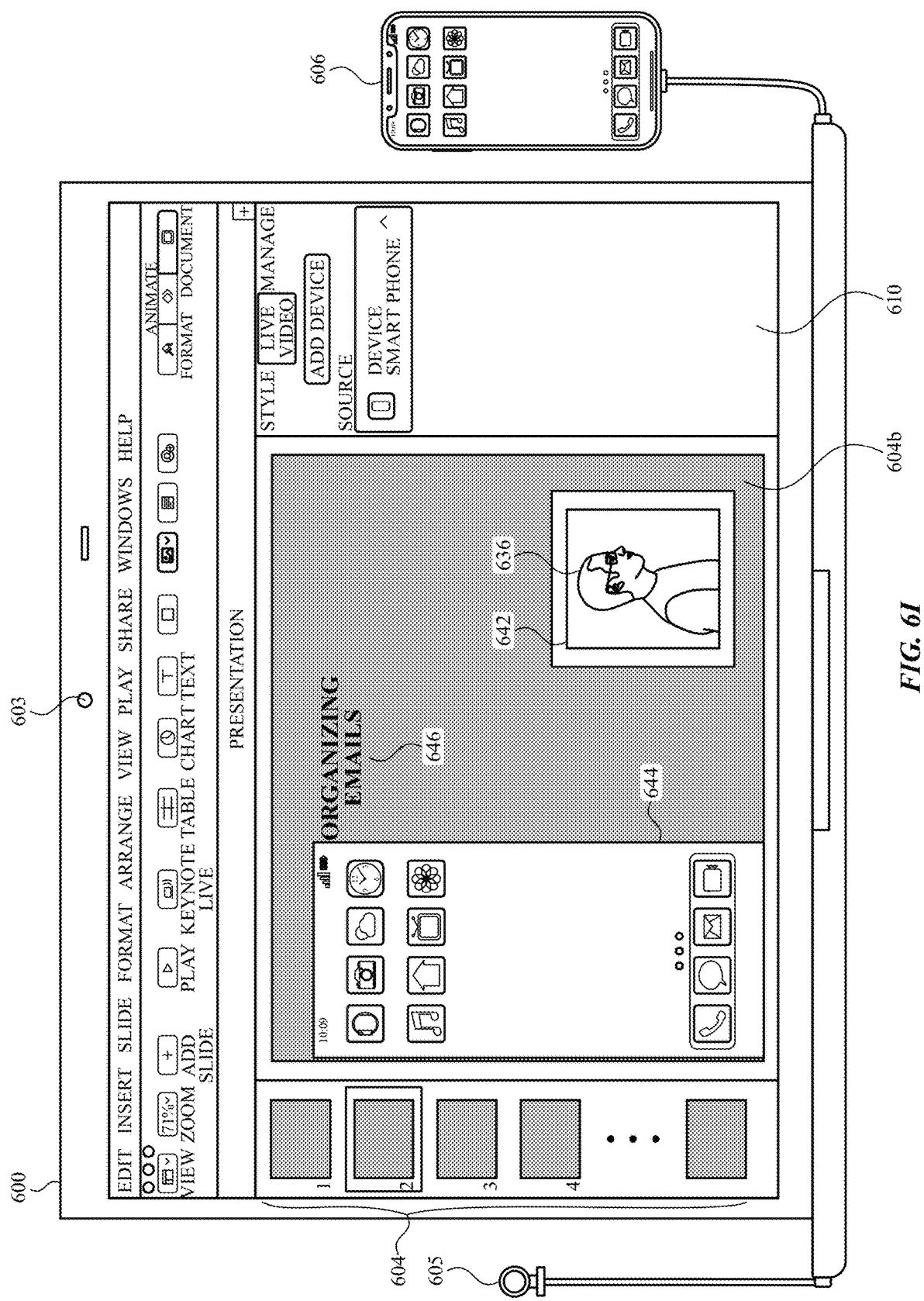

In some examples, a slide of presentation 604 may include multiple live video streams (e.g., by virtue of multiple live objects being inserted onto the slide). For example, while displaying slide 604*a*, device 600 detects one or more user inputs (e.g., click inputs) requesting a transition from slide 604*a* of presentation 604 to slide 604*b* of presentation 604. In response, device 600 replaces display of slide 604*a* in editing interface 610 with slide 604*b*, as shown in FIG. 6I. As shown, slide 604*b* has been updated to include live objects 642, 644 and text box 646.

In the example illustrated in FIG. 6I, the live video source of live object 642 is "Side Camera", which is camera 605 having a field of view oriented toward a side of user 636. Accordingly, live object 642 includes a live video stream of user 636 from a side perspective. The live video source of live object 644 is "Smart Phone" (i.e., device 606). Accordingly, live object 644 includes a live video stream that is a mirror of a display of device 606. As the content of the display of device 606 is updated, the same updates are displayed as part of live object 644. Because live object 642 and live object 644 have different video sources, display of slide 604*b* will include display of multiple live video streams, each of which, optionally, is displayed according to user-specified display characteristics.

Figure 6J:
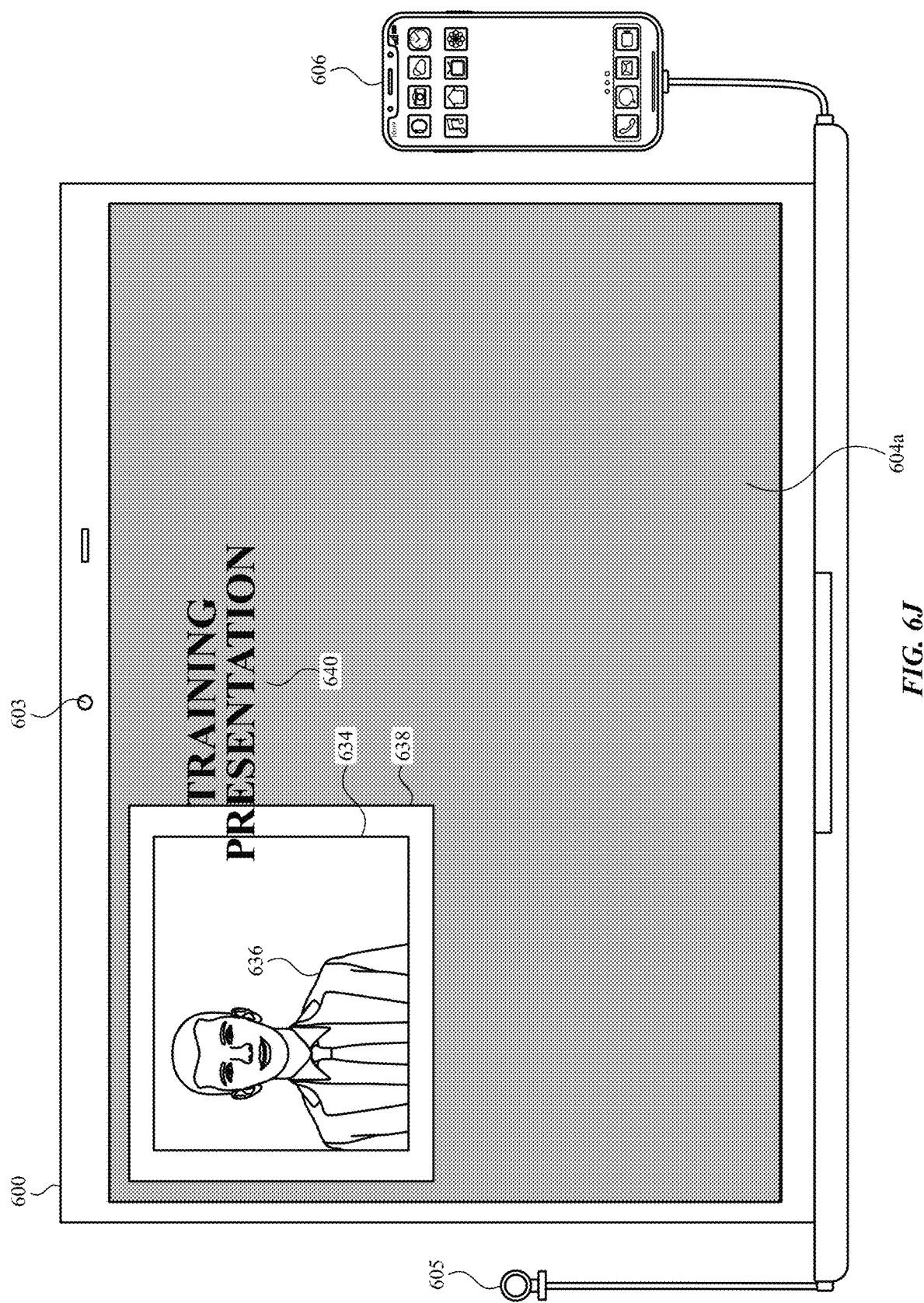
Figure 6K:
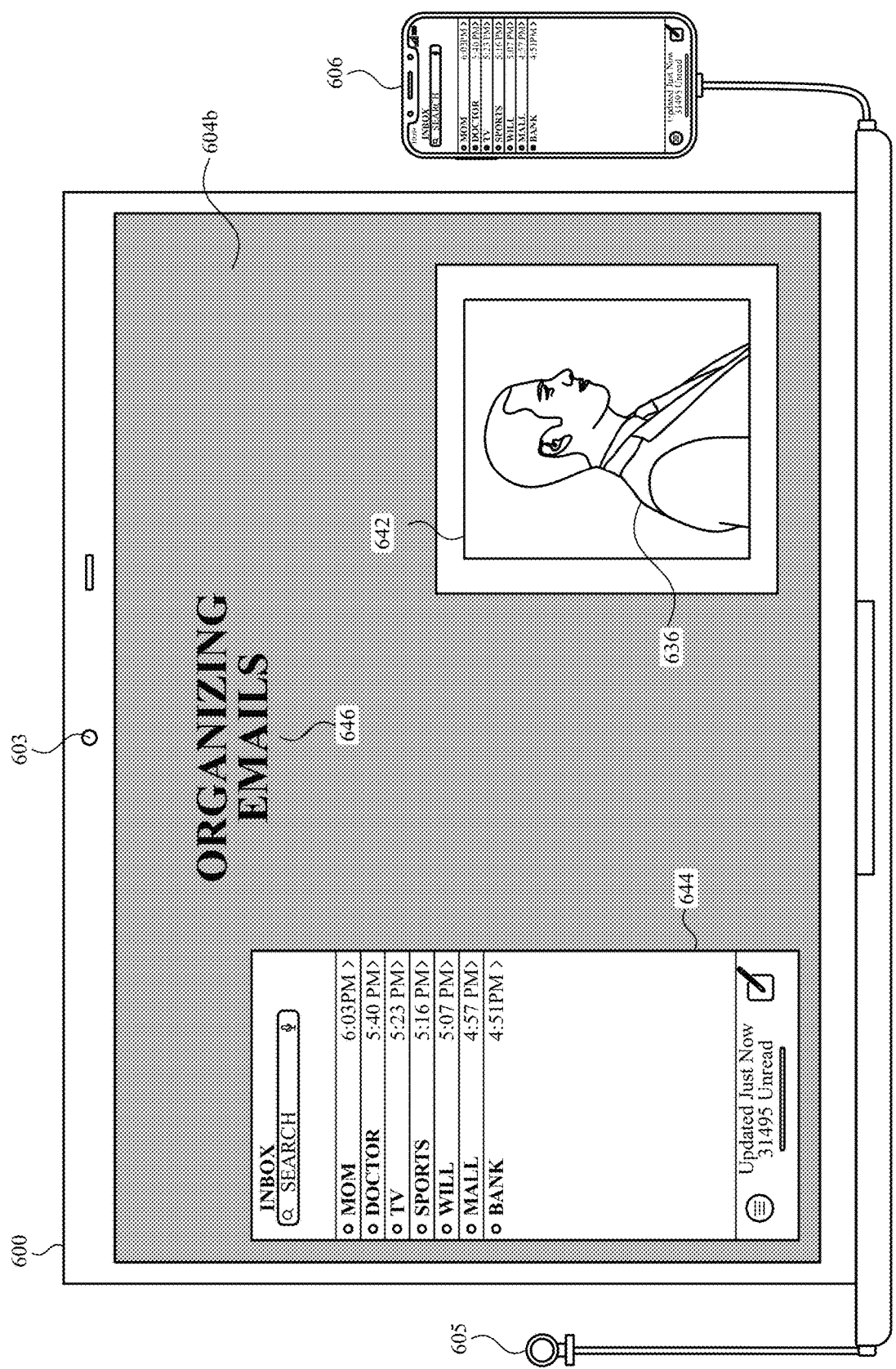

FIGS. 6J-6K illustrate examples in which user 636 operates electronic device 600 in a presentation mode for presenting presentation 604. The presentation mode may be initiated, for instance, using the presentation program.

In FIG. 6J, device 600 displays slide 604*a*. As shown, slide 604*a* includes live object 634, frame 638, and text box 640, and is displayed in a manner corresponding to slide 604*a*, as shown in FIG. 6H. While slide 604*a* is displayed, live object 634 includes a live video stream provided by camera 602 (recall that camera 602 was selected as the live video source for object 634 while device 600 operated in the editing mode).

It will be appreciated that although slide 604*a* may be unchanged when transitioning from the editing mode to the presentation mode, because live object 634 provides a live video stream during each of the modes, content of the live video stream may vary. For example, as shown in FIGS. 6E-6H, while displaying slide 604*a* in the editing mode, user 636 is shown in the live video stream of live object 634 as wearing casual attire (e.g., t-shirt) and glasses. In contrast, as shown in FIG. 6J, while displaying slide 604*a* in the presentation mode, user 636, now wearing formal business attire for the presentation, is shown in the live video stream of live object 634 as wearing the formal business attire (e.g., tie and coat) and not wearing glasses.

While displaying slide 604*a*, device 600 detects one or more user inputs (e.g., click inputs) requesting a transition from slide 604*a* of presentation 604 to slide 604*b* of presentation 604. In response, device 600 replaces display of slide 604*a* with slide 604*b*, as shown in FIG. 6J.

As shown, slide 604*b* includes live object 642, live object 644, and text box 646, and is displayed in a manner corresponding to slide 604*b* as shown in FIG. 6I. While displaying slide 604*b*, live object 642 includes a live video stream provided by camera 605 (recall that camera 605 was selected as the live video source for object 642 while device 600 operated in the editing mode). Concurrently, live object 644 includes a live video stream provided by device 606 (recall that device 606 was selected as the live video source for object 642 while device 600 operated in the editing mode). By concurrently displaying live objects 644 and 642, device 600 allows viewers of the presentation to view the presenter (user 636) and the contents of the display of device 606 live. Thus, user 636 can address the audio and demonstrate techniques on device 606 live, using the presentation.

It will be appreciated that although slide 604*b* may be unchanged when transitioning from the editing mode to the presentation mode, because live objects 642, 644 provide live video streams during each of the modes, content of the live video streams may vary. For example, as shown in FIG. 6I, while displaying slide 604*b* in the editing mode, user 636 is shown in the live video stream of live object 642 as wearing casual attire (e.g., t-shirt) and glasses. In contrast, as shown in FIG. 6K, while displaying slide 604*b* in the presentation mode, user 636 has changed attire into formal business attire and, therefore, user 636 is shown in the live video stream of live object 642 as wearing formal business attire (e.g., tie and coat) and not wearing glasses. As another example, as shown in FIG. 6I, while displaying slide 604*b* in the editing mode, the display of device 606 is shown in the live video stream of live object 644 as displaying a home screen interface. In contrast, as shown in FIG. 6K, while displaying slide 604*b* in the presentation mode, the display of device 606 is shown in the live video stream of live object 644 as displaying an inbox of an email application.

In some embodiments, live video streams included in one or more live objects may be recorded (e.g., in response to user input) during operation in the editing mode and/or the presentation mode. Thereafter, recordings of live video streams may be displayed in live objects during operation in the presentation mode (or subsequent presentations in the presentation mode). In some embodiments, displaying recordings in this manner replaces display of live video streams during operation of the presentation mode.

FIG. 7 is a flow diagram illustrating a method for providing live video using a computer system in accordance with some embodiments. Method 700 is performed at a computer system (e.g., 100, 300, 500) that is, optionally, in communication with a display generation component and one or more input devices. In some embodiments, the computer system is in communication with a first camera and an external non-camera device, such as a smart phone or tablet. Some operations in method 700 are, optionally, combined, the orders of some operations are, optionally, changed, and some operations are, optionally, omitted.

As described below, method 700 provides an intuitive way for providing live video. The method reduces the cognitive burden on a user and reduces computational requirements for providing live video, thereby creating a more efficient human-machine interface and system. For battery-operated computing devices, enabling a user to provide live video faster and more efficiently conserves power and increases the time between battery charges.

While in an editing mode for a presentation (e.g., 604) (e.g., a slide presentation), the computer system receives (705), via one or more input devices (e.g., a computer pointer, a keyboard, a touch-sensitive surface), a request (e.g., 650*d*, 650*e*) to insert a live object (e.g., 634, 642, 644) (e.g., an object that corresponds to a device (e.g., a camera, a phone, and/or a tablet) configured to provide a live video stream) onto a first slide (e.g., 604*b*) (e.g., at a first location and/or at a first size on the slide) of the presentation (e.g., onto slide 2 of 6 total slides). In some embodiments, the request includes associating (e.g., via a user selection) the live object with a source (e.g., 603, 605, 606) (e.g., a first camera that is in (wired or wireless) communication with the computer system, a second camera that is in (wired or wireless) communication with the computer system, or a non-camera external device (such as a smart phone or tablet) that is in (wired or wireless) communication with the computer system) for live video. In some embodiments, in response to receiving the request to insert the live object onto the first slide of the presentation, the computer system inserts the live object onto the first slide of the presentation.

While in a presentation mode for the presentation (e.g., 604) (e.g., in full screen and/or not including editing options for the presentation), the computer system displays (710), via a display generation component, the first slide (e.g., 604*a*, 604*b*) including concurrent display of the live object (e.g., 634, 642, 644) (e.g., at the first location and/or at the first size on the slide) and one or more visual elements (e.g., 638, 640) (e.g., that are not live video streams, that are static objects, a slide title, a static image, and/or a pre-recorded video).

In some embodiments, in accordance with (715) a determination that the live object is associated with a first camera (e.g., that is integrated into a housing of the computer system, that is not integrated into a housing of the computer system) (and, optionally, not associated with the external non-camera device), the live object (e.g., 634) includes a live video stream from the first camera (e.g., 603, 605) (e.g., without including the live video stream mirroring the display of the non-camera external device).

In some embodiments, in accordance with (720) a determination that the live object is associated with a non-camera external device (e.g., 606) (e.g., a smart phone or tablet) (and, optionally, not associated with the first camera), the live object (e.g., 634) includes a live video stream that mirrors at least a portion of (e.g., all of, less than all of) a display of the non-camera external device (e.g., without including the live video stream from the first camera).

Displaying a live video stream of a video source that is from a camera or non-camera external device enables the presentation to include live video embedded into the presentation, thereby providing viewers with improved visual feedback of the field of view of the camera or the contents of the display of the non-camera external device.

In some embodiments, displaying, via a display generation component, the first slide including concurrent display of the live object and one or more visual elements includes, in accordance with a determination that the live object is associated with a second camera (e.g., 605) (e.g., an external camera, different from the first camera, that is not integrated into the housing of the computer system and/or is connected wirelessly or by wire to the computer system) (and, optionally, not associated with the first camera or the non-camera external device) different from the first camera, the live object includes a live video stream (e.g., of at least a portion of the field of view of) from the second camera (e.g., without including the live video stream from the first camera or the live video stream mirroring the display of the non-camera external device).

Displaying a live video stream of a video source that is from a second camera enables the presentation to include the live video embedded into the presentation, thereby providing viewers with improved visual feedback of the field of view of the second camera.

In some embodiments, the computer system displays, via a display generation component, a second live object (e.g., at the first location and/or at the first size on the slide) that is associated with a second camera (e.g., 605) (e.g., an external camera, different from the first camera, that is not integrated into the housing of the computer system and/or is connected wirelessly or by wire to the computer system) (and, optionally, not associated with the first camera or the non-camera external device) different from the first camera (e.g., 603). In some embodiments, the second live object includes a live video stream (e.g., of at least a portion of the field of view of) from the second camera (e.g., without including the live video stream from the first camera or the live video stream mirroring the display of the non-camera external device).

In some embodiments, the second live object (e.g., an object placed at a second location and/or second size in a slide of the presentation) is displayed, via the display generation component and concurrently with the live object and the one or more visual elements (e.g., 638, 640, 646), as part of the first slide of the presentation.

Displaying multiple live video streams on a single slide provides viewers with concurrent visual feedback of the fields of view of the cameras, thereby providing improved visual feedback. Additionally, displaying multiple live video streams as objects included in a single slide allows the computer system to display both streams without requiring user input to switch between different slides, each with their own stream, thereby reducing the number of required user inputs.

In some embodiments, the second live object (e.g., 642, 644) (e.g., an object placed at a second location and/or second size in a slide of the presentation) is displayed, via the display generation component, as part of a second slide (e.g., 604*b*) of the presentation (e.g., 604) that is different from the first slide (e.g., 604*a*).

Displaying different live video streams corresponding to different object on different slides provides viewers with timely visual feedback of the fields of view of the cameras, thereby providing improved visual feedback. For example, the video streams are displayed concurrently with other relevant text and/or images on the respective slide.

In some embodiments, while in the editing mode for the presentation, the computer system receives, via one or more input devices (e.g., a computer pointer, a keyboard, a touch-sensitive surface), a second request to insert a third live object (e.g., an object that corresponds to a device (e.g., a camera, a phone, and/or a tablet) configured to provide a live video stream) onto a second slide (e.g., 604*b*) (e.g., at a second location and/or at a second size on the slide) of the presentation (e.g., onto slide 3 of 6 total slides). In some embodiments, the second request includes associating (e.g., via a user selection) the live object with a source (e.g., 605, 606) (e.g., a first camera that is in (wired or wireless) communication with the computer system, a second camera that is in (wired or wireless) communication with the computer system, or a non-camera external device (such as a smart phone or tablet) that is in (wired or wireless) communication with the computer system) for live video.

In some embodiments, while in the presentation mode for the presentation (e.g., in full screen and/or not including editing options for the presentation), the computer system displays, via the display generation component, the second slide (e.g., 604*b*) including the third live object (e.g., 642, 644). In some embodiments, in accordance with a determination that the third live object is associated with the first camera (e.g., 603) (e.g., that is integrated into a housing of the computer system, that is not integrated into a housing of the computer system) (and, optionally, not associated with the external non-camera device), the third live object includes a live video stream from the first camera (e.g., without including the live video stream mirroring the display of the non-camera external device).

In some embodiments, in accordance with a determination that the third live object is associated with a second camera (e.g., an external camera, different from the first camera, that is not integrated into the housing of the computer system and/or is connected wirelessly or by wire to the computer system) (and, optionally, not associated with the first camera or the non-camera external device) different from the first camera, the third live object includes a live video stream (e.g., of at least a portion of the field of view of) from the second camera (e.g., without including the live video stream from the first camera or the live video stream mirroring the display of the non-camera external device).

In some embodiments, in accordance with a determination that the third live object is associated with a non-camera external device (e.g., a smart phone or tablet) (and, optionally, not associated with the first camera), the third live object (e.g., 644) includes a live video stream that mirrors at least a portion of (e.g., all of, less than all of) a display of the non-camera external device (e.g., 606) (e.g., without including the live video stream from the first camera or the second camera). In some embodiments, while displaying the first slide (e.g., 604*b*) during the presentation mode, the computer system receives an input from the user requesting to transition to the second slide and, in response, ceases to display the first slide (and, accordingly, the objects of the first slide) and displays the second slide (e.g., 604*b*) (and, accordingly, the objects of the second slide).

Displaying a live video stream of a video source that is from a camera or non-camera external device enables the second slide of the presentation to include live video embedded into the presentation, thereby providing viewers with improved visual feedback of the field of view of the camera or the contents of the display of the non-camera external device.

In some embodiments, receiving the request to insert the live object onto the first slide of the presentation includes receiving a selection of a device (e.g., 651*c*, 650*e*) (e.g., a first camera, a second camera, a smartphone) from among a plurality of displayed device identifiers (e.g., a list and/or a drop-down list) to associate the live object with a source for live video from the device corresponding to the selected device identifier.

In some embodiments, prior to receiving the request to insert the live object onto the first slide of the presentation, the computer system receives user input (e.g., 650*b*) to add a device identifier (e.g., a first camera, a second camera, a smartphone) to the plurality of device identifiers for selection for associating with a live object. In some embodiments, the computer system receives one or more user inputs that selects a device configured to provide a live video stream. The computer system optionally also receives a user-specified name (e.g., name inserted in name field 664) (e.g., "side camera") for the selected device. Based on receiving the selection of the device and the user-specified name for the device, the computer system adds the selected device to the list of devices available to be selected as a source for live video for live objects.

In some embodiments, while in an editing mode for the presentation (e.g., the slide presentation), the computer system receives, via one or more input devices (e.g., a computer pointer, a keyboard, a touch-sensitive surface), a request (e.g., 650*f*) to specify one or more visual characteristics (e.g., location on the slide, animation (such as movement, rotation) on the slide, zoom size, filter, cropping, color, border (such as a frame), gradient (such as one side of the object being (e.g., partially, fully) transparent and the opposite side of the object not being transparent), and/or shading) of the live object. In some embodiments, displaying the live object as part of the first slide includes displaying the live object with the one or more visual characteristics.

In some embodiments, the computer system receives selection of the one or more visual characteristics before adding the live object to the first slide and, as a result, the live object is added to the first slide (e.g., 604*a*) with the selected visual characteristics. In some embodiments, the live object is already part of the first slide when the computer system receives the request to specify the one or more visual characteristics and, in response, updates (changes) the specified one or more visual characteristics of the object as requested.

Enabling the computer system to receive user inputs to specify visual characteristics of the live object enables the computer system to display the live object with the specified visual characteristics, thereby providing viewers with improved visual feedback of the field of view of the camera or the contents of the display of the non-camera external device.

In some embodiments, a first visual characteristic of the one or more visual characteristics specifies a portion of (e.g., less than all of) a field of view of (e.g., not a center portion of) the source to include for the live object (and/or specifies a portion of the field of view of the source to not include for the live object) (e.g., portion of live object 634 shown in FIG. 6H).

Reducing the portion of the field of view of a source being displayed and/or processed reduces the processing power required, thereby saving battery power, and also helps to maintain the required portion of the video at a larger size, thereby providing the user with improved visual feedback.

In some embodiments, while in the presentation mode for the presentation (e.g., in full screen and/or not including editing options for the presentation), the live object is displayed with the one or more visual characteristics. In some embodiments, the computer system receives input from the user specifying the portion of the field of view of the camera to use for the live feed during the presentation editing mode and re-uses that same portion of the field of view of the camera for the live feed during the presentation mode of the presentation.

Reducing the portion of the field of view of a source being displayed and/or processed reduces the processing power required, thereby saving battery power, and also helps to maintain the required portion of the video at a larger size, thereby providing the user with improved visual feedback.

In some embodiments, subsequent to receiving the request to insert the live object onto the first slide of the presentation with the source (e.g., a live camera stream) associated with the live object for the live video, the computer system receives a request to associate a second source (e.g., 605, 606) (e.g., a live video stream that mirrors a non-camera external device, different from the current source) with the live object for the live video.

In some embodiments, in response to receiving the request to associate the second source (e.g., a live video stream that mirrors a non-camera external device) with the live object for the live video, the computer system ceases to display a live video from the first source as part of the live object (e.g., in the editing mode) and displaying a live video from the second source as part of the live object.

In some embodiments, prior to receiving the request to associate the second source with the live object for the live video, the live object is displayed with a plurality of user-specified visual characteristics (e.g., location on the slide, animation (such as movement, rotation) on the slide, zoom size, filter, cropping, color, border (such as a frame), gradient (such as one side of the object being (e.g., partially, fully) transparent and the opposite side of the object not being transparent), and/or shading).

In some embodiments, the live video from the second source is displayed as part of the live object with the plurality of user-specified visual characteristics (e.g., location on the slide, animation (such as movement, rotation) on the slide, zoom size, filter, cropping, color, border (such as a frame), gradient (such as one side of the object being (e.g., partially, fully) transparent and the opposite side of the object not being transparent), and/or shading). In some embodiments, the computer system inserts a live object into a presentation and receives user inputs to specify the visual characteristics (e.g., location on the slide, animation (such as movement, rotation) on the slide, zoom size, filter, cropping, color, border (such as a frame), gradient (such as one side of the object being (e.g., partially, fully) transparent and the opposite side of the object not being transparent), and/or shading) of the object and the source (e.g., a first camera, a second camera, a display of a non-camera device) of the live video for the object. When the computer system subsequently receives user input change the source of the live video for the object, the computer system updates the object to display the updated source for the live video but continues to display the live object with the visual characteristics previously specified by the user.

Maintaining the visual characteristics of the live object that were previously specified by the user when changing the source of the live video for the live object enables the user to update the object to include a desired video source without requiring the user to provide multiple inputs to again reproduced the visual characteristics previously provided, thereby reducing the number of user inputs required.

In some embodiments, (e.g., while in the presentation mode for the presentation), while displaying, via the display generation component, the first slide including concurrent display of the live object and one or more visual elements, the computer system receives user input requesting to transition to a second slide.

In some embodiments, in response to receiving the request to transition to the second slide, the computer system ceases to display the first slide and displaying the second slide. In some embodiments, the second slide includes one or more live objects and or one or more visual elements (e.g., slide #, date, title of slide, and/or content).

In some embodiments, the computer system receives user input requesting to record presenting of the presentation. In some embodiments, in response to receiving user input requesting to record presenting of the presentation, the computer system records a first video feed associated with a first live object while the first live object is displayed as part of a first slide of the presentation (e.g., while in presentation mode, and/or without recording a video of other visual elements of the presentation, and/or without recording video feeds of live objects that are not displayed).

In some embodiments, in response to receiving user input requesting to record presenting of the presentation, the computer system records a second video feed associated with a second live object while the second live object is displayed as part of a second slide of the presentation (e.g., while in presentation mode, and/or without recording a video of other visual elements of the presentation, and/or without recording video feeds of live objects that are not displayed). In some embodiments, the computer system records the video from sources associated with live objects that are displayed as part of the presentation. For example, if a first slide has a first object associated with a first camera, the computer system records the video from the first camera while the first object continues to be displayed (e.g., while the first slide with the first object continues to be displayed). When the computer system replaces the first slide with a second slide, the computer system stops recording video from the first camera if the second slide does not include a live object associated with the first camera and, instead, records videos for sources from live objects on the second slide. In this way, the recorded videos can be inserted into the presentation for subsequent playback.

Recording the live video feeds when live objects associated with the live video feeds are displayed allows the computer system to record a presenter presenting slides and/or a device's display during the presentation for playback at a future live presentation (e.g., the streams are recorded, but the presenter can still manually navigate between the slides during the future live presentation), thereby reducing the number of times the presenter should provide audio input to the computer system for presenting the slides.

In some embodiments, while in the presentation mode, the computer system displays the first slide and using the recorded first video as the source for the first live object (and, optionally, not transitioning to the second slide (even after the recorded first video ends) until user input is received requesting to transition to the second slide).

In some embodiments, while in the presentation mode, the computer system displays the second slide and using the recorded second video as the source for the second live object.

Enabling the computer system to transition between slides based on user input when the slides include previously recording video streams allows the computer system to keep pace with the presenter, such as by enabling a slide to remain displayed for an extended duration (after the playback of videos on the slide end) so that the presenter can provide additional description during the future presentation before the presenter provides input to transition to a subsequent slide.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources (e.g., sources for live video) to provide live video, for instance, in a presentation. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify sources from which live video is provided and/or display a live video feed of a user during a presentation.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of live video, personal identification information may be selectively omitted from live video provided by one or more sources as the present technology can be configured to allow users to select to "opt in" or "opt out" of participation in the collection or display of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system configured to communicate with a display generation component and one or more input devices, comprising:
one or more processors; and
memory storing one or more programs configured to be executed by the one or more processors, the one or more programs including instructions for:
displaying, via the display generation component, a first slide including concurrent display of a live object and one or more visual elements, wherein:
in accordance with a determination that the live object is associated with a first camera, the live object includes a live video stream from the first camera; and
in accordance with a determination that the live object is associated with a non-camera external device, the live object includes a live video stream that mirrors at least a portion of a display of the non-camera external device.

2. The computer system of claim 1, wherein displaying, via a display generation component, the first slide including concurrent display of the live object and one or more visual elements includes:
in accordance with a determination that the live object is associated with a second camera different from the first camera, the live object includes a live video stream from the second camera.

3. The computer system of claim 1, the one or more programs further including instructions for:
displaying, via the display generation component, a second live object that is associated with a second camera different from the first camera, wherein the second live object includes a live video stream.

4. The computer system of claim 3, wherein the second live object is displayed, via the display generation component and concurrently with the live object and the one or more visual elements, as part of the first slide.

5. The computer system of claim 3, wherein the second live object is displayed, via the display generation component, as part of a second slide that is different from the first slide.

6. The computer system of claim 1, the one or more programs further including instructions for:
displaying, via the display generation component, a second slide including a third live object, wherein:
in accordance with a determination that the third live object is associated with the first camera, the third live object includes a live video stream from the first camera;
in accordance with a determination that the third live object is associated with a second camera different from the first camera, the third live object includes a live video stream from the second camera; and
in accordance with a determination that the third live object is associated with the non-camera external device, the third live object includes a live video stream that mirrors at least a portion of the display of the non-camera external device.

7. The computer system of claim 1, the one or more programs further including instructions for:
receiving, via one or more input devices, a request to specify one or more visual characteristics of the live object; and
wherein displaying the live object as part of the first slide includes displaying the live object with the one or more visual characteristics.

8. The computer system of claim 7, wherein a first visual characteristic of the one or more visual characteristics specifies a portion of a field of view of a source for live video to include for the live object.

9. The computer system of claim 1, the one or more programs further including instructions for:
while displaying, via the display generation component, the first slide including concurrent display of the live object and one or more visual elements, receiving user input requesting to transition to a second slide; and
in response to receiving the request to transition to the second slide, ceasing to display the first slide and displaying the second slide.

10. The computer system of claim 1, the one or more programs further including instructions for:
receiving user input requesting to record a presentation; and
in response to receiving user input requesting to record the presentation:
recording a first video feed associated with a first live object while the first live object is displayed as part of the first slide; and
recording a second video feed associated with a second live object while the second live object is displayed as part of a second slide.

11. The computer system of claim 10, the one or more programs further including instructions for:
displaying the first slide and using the recorded first video as a source for the first live object; and
displaying the second slide and using the recorded second video as a source for the second live object.

12. A non-transitory computer-readable storage medium storing one or more programs configured to be executed by one or more processors of a computer system that is in communication with a display generation component and one or more input devices, the one or more programs including instructions for:
displaying, via the display generation component, a first slide including concurrent display of a live object and one or more visual elements, wherein:
in accordance with a determination that the live object is associated with a first camera, the live object includes a live video stream from the first camera; and
in accordance with a determination that the live object is associated with a non-camera external device, the live object includes a live video stream that mirrors at least a portion of a display of the non-camera external device.

13. The non-transitory computer-readable storage medium of claim 12, wherein displaying, via a display generation component, the first slide including concurrent display of the live object and one or more visual elements includes:

in accordance with a determination that the live object is associated with a second camera different from the first camera, the live object includes a live video stream from the second camera.

14. The non-transitory computer-readable storage medium of claim 12, the one or more programs further including instructions for:
displaying, via the display generation component, a second live object that is associated with a second camera different from the first camera, wherein the second live object includes a live video stream.

15. The non-transitory computer-readable storage medium of claim 14, wherein the second live object is displayed, via the display generation component and concurrently with the live object and the one or more visual elements, as part of the first slide.

16. The non-transitory computer-readable storage medium of claim 14, wherein the second live object is displayed, via the display generation component, as part of a second slide that is different from the first slide.

17. The non-transitory computer-readable storage medium of claim 12, the one or more programs further including instructions for:
displaying, via the display generation component, a second slide including a third live object, wherein:
in accordance with a determination that the third live object is associated with the first camera, the third live object includes a live video stream from the first camera;
in accordance with a determination that the third live object is associated with a second camera different from the first camera, the third live object includes a live video stream from the second camera; and
in accordance with a determination that the third live object is associated with the non-camera external device, the third live object includes a live video stream that mirrors at least a portion of the display of the non-camera external device.

18. The non-transitory computer-readable storage medium of claim 12, the one or more programs further including instructions for:
receiving, via one or more input devices, a request to specify one or more visual characteristics of the live object; and
wherein displaying the live object as part of the first slide includes displaying the live object with the one or more visual characteristics.

19. The non-transitory computer-readable storage medium of claim 18, wherein a first visual characteristic of the one or more visual characteristics specifies a portion of a field of view of a source for live video to include for the live object.

20. The non-transitory computer-readable storage medium of claim 12, the one or more programs further including instructions for:
while displaying, via the display generation component, the first slide including concurrent display of the live object and one or more visual elements, receiving user input requesting to transition to a second slide; and
in response to receiving the request to transition to the second slide, ceasing to display the first slide and displaying the second slide.

21. The non-transitory computer-readable storage medium of claim 12, the one or more programs further including instructions for:
receiving user input requesting to record a presentation; and in response to receiving user input requesting to record the presentation:
recording a first video feed associated with a first live object while the first live object is displayed as part of the first slide; and
recording a second video feed associated with a second live object while the second live object is displayed as part of a second slide.

22. The non-transitory computer-readable storage medium of claim 21, the one or more programs further including instructions for:
displaying the first slide and using the recorded first video as a source for the first live object; and
displaying the second slide and using the recorded second video as a source for the second live object.

23. A method, comprising:
at a computer system that is in communication with a display generation component and one or more input devices:
displaying, via the display generation component, a first slide including concurrent display of a live object and one or more visual elements, wherein:
in accordance with a determination that the live object is associated with a first camera, the live object includes a live video stream from the first camera; and
in accordance with a determination that the live object is associated with a non-camera external device, the live object includes a live video stream that mirrors at least a portion of a display of the non-camera external device.

24. The method of claim 23, wherein displaying, via a display generation component, the first slide including concurrent display of the live object and one or more visual elements includes:
in accordance with a determination that the live object is associated with a second camera different from the first camera, the live object includes a live video stream from the second camera.

25. The method of claim 23, further comprising:
displaying, via the display generation component, a second live object that is associated with a second camera different from the first camera, wherein the second live object includes a live video stream.

26. The method of claim 25, wherein the second live object is displayed, via the display generation component and concurrently with the live object and the one or more visual elements, as part of the first slide.

27. The method of claim 25, wherein the second live object is displayed, via the display generation component, as part of a second slide that is different from the first slide.

28. The method of claim 23, further comprising:
displaying, via the display generation component, a second slide including a third live object, wherein:
in accordance with a determination that the third live object is associated with the first camera, the third live object includes a live video stream from the first camera;
in accordance with a determination that the third live object is associated with a second camera different from the first camera, the third live object includes a live video stream from the second camera; and
in accordance with a determination that the third live object is associated with the non-camera external device, the third live object includes a live video stream that mirrors at least a portion of the display of the non-camera external device.

29. The method of claim 23, further comprising:
receiving, via one or more input devices, a request to specify one or more visual characteristics of the live object; and
wherein displaying the live object as part of the first slide includes displaying the live object with the one or more visual characteristics.

30. The method of claim 29, wherein a first visual characteristic of the one or more visual characteristics specifies a portion of a field of view of a source for live video to include for the live object.

31. The method of claim 23, further comprising:
while displaying, via the display generation component, the first slide including concurrent display of the live object and one or more visual elements, receiving user input requesting to transition to a second slide; and
in response to receiving the request to transition to the second slide, ceasing to display the first slide and displaying the second slide.

32. The method of claim 23, further comprising:
receiving user input requesting to record a presentation; and
in response to receiving user input requesting to record the presentation:
recording a first video feed associated with a first live object while the first live object is displayed as part of the first slide; and
recording a second video feed associated with a second live object while the second live object is displayed as part of a second slide.

33. The method of claim 32, further comprising:
displaying the first slide and using the recorded first video as a source for the first live object; and
displaying the second slide and using the recorded second video as a source for the second live object.

* * * * *